United States Patent [19]

Ikezawa et al.

[11] Patent Number: 5,471,535
[45] Date of Patent: Nov. 28, 1995

[54] METHOD FOR DETECTING A CONTOUR OF A GIVEN SUBJECT TO BE SEPARATED FROM IMAGES AND APPARATUS FOR SEPARATING A GIVEN SUBJECT FROM IMAGES

[75] Inventors: Mitsuru Ikezawa, Kodaira; Takafumi Miyatake, Hachioji; Hirotada Ueda, Kokubunji; Shigeo Sumino, Chofu; Satoshi Yoshizawa, Kawasaki, all of Japan

[73] Assignee: Institute for Personalized Information Environment, Tokyo, Japan

[21] Appl. No.: 840,822

[22] Filed: Feb. 25, 1992

[30] Foreign Application Priority Data

Sep. 18, 1991 [JP] Japan .................................... 3-237899

[51] Int. Cl.⁶ ..................................................... G06K 9/48
[52] U.S. Cl. ........................... 382/199; 382/162; 356/376
[58] Field of Search .................................. 382/22, 54, 17, 382/25, 1, 25; 356/376, 380, 375, 387

[56] References Cited

U.S. PATENT DOCUMENTS

| | | | |
|---|---|---|---|
| 4,679,941 | 7/1987 | Fujita | 356/387 |
| 4,817,184 | 3/1989 | Thomason | 382/22 |
| 4,961,425 | 10/1990 | Kennedy et al. | 382/6 |
| 5,016,173 | 5/1991 | Kenet | 382/22 |
| 5,050,227 | 9/1991 | Furusawa | 382/22 |
| 5,204,918 | 4/1993 | Hirosawa | 382/54 |

FOREIGN PATENT DOCUMENTS

| | | |
|---|---|---|
| 334230 | 9/1989 | European Pat. Off. . |
| 342379 | 11/1989 | European Pat. Off. . |

OTHER PUBLICATIONS

H. Chu et al., "Detecting Left Ventricular Endocardial and Epicardial Boundaries by Digital Two–Dimensional Echocariography," *Transactions on Medical Imaging*, Jun. 1988, pp. 81–90.

L. D. Cohen, "On Active Contour Models and Balloons," *Image Understanding*, Mar. 1991, pp. 211–218.

*Primary Examiner*—Yon J. Couso
*Attorney, Agent, or Firm*—Antonelli, Terry, Stout & Kraus

[57] ABSTRACT

A method for detecting a contour of a given subject to be separated from images utilizing an image separating system. First, a plurality of candidate points which have been input by a user are displayed on a screen. A smooth curve which connects the plurality of candidate points is determined and is displayed on a display apparatus. The intensity of light on a straight line extending in a direction normal to each candidate point is determined. The position of the candidate point is corrected based upon the rate of change in the intensity of light which is determined for each candidate point. A smooth curve which passes the corrected candidate points is determined and is displayed on the display apparatus. The specified image, represented by the smooth curve connecting the corrected candidate points, is then separated from the rest of the image elements.

11 Claims, 16 Drawing Sheets

METHOD FOR DETECTING A CONTOUR OF A GIVEN SUBJECT TO BE SEPARATED FROM IMAGES AND APPARATUS FOR SEPARATING A GIVEN SUBJECT FROM IMAGES

BACKGROUND OF THE INVENTION

The present invention relates to an image-separating point detecting process for separating only a subject image from images having gradation and an image separating apparatus using the same and in particular to a method for detecting points to separate a specific subject image from multi-color natural images which are picked up by a television camera and an image separating system.

An image synthesizing technique for merging a given subject image in one scene into another image background scene and the like has heretofore been used in the process for preparation of a picture such as movie or commercial poster. The commercial image synthesizing technique includes two approaches as follows:

(a) A screen projection approach. An image which will become a background is projected on a screen and a given subject or object is placed before the screen and the image of the given subject is picked up together with the background.

(b) A chromakey synthesizing approach. A single background (usually referred to as blue back) is used at the time of editing. The image of a given subject is extracted on the basis of the difference in color components of the given subject and the background and is merged into the other image (background). In both methods, a special apparatus has to be used for picture taking. It is hard to merge an image which has previously been picked up with the other different background scene.

In other words, in order to achieve image synthesizing for an image which has been picked up, this synthesizing should be carried out in the editing phase.

Recently, home video cameras have become popular. There may be a need to remove a redundant image from a number of images which were picked up in the background, or to conduct editing for synthesizing the image of a person with a special background. Also in this case, much effort is necessary since such editing is performed manually for every image of a motion picture.

As one of a plurality of editing functions, an operation to automatically extract a given subject from taken images is required.

(a) A method for separating a given subject image which is performed by a computer has been proposed in, for example, "SNAKES: Active Contour Models" (Proc. ICCV-87, PP. 259 to 268, 1987). The method comprises modelling the contour of a subject based upon the features of the subject, defining the contour as a function and inferring the contour in the vicinity of an initial input by determining the contour in accordance with the features of the preliminarily defined function even if a part of the contour of the subject is not clear.

(b) A technique to separate a motion subject by determining differences between the frames of motion picture is disclosed in, for example, "Development of Video Surveillance System using Motion Information" (October National Convention Summary Record of the Institute of Electronics and Communication Engineers of Japan, page 7–178, 1991). First, differences between frames are determined by performing a linear operation for each pixel of the image over continuous frames. Thereafter, the points of changes are used to trace a locus of a moving subject for separating a given subject image.

(c) A system for separating a given subject image by using color information of image is disclosed in, for example, JP-B-2-4027. In this system, a histogram is determined by performing a color linear operation for each pixel and then a given subject image is separated by thresholding the results.

SUMMARY OF THE INVENTION

The methods (a) and (c) have not been practically used for automatically extracting a desired specific subject for the following reasons: The separation accuracy is insufficient when they are applied for a natural image by merely performing a functional approximation based upon a simple model or a linear operation for each pixel since the conditions and the environment vary. For example, the complication of the shape of the contour of one subject is different from those of the other subjects, a local deviation of the distribution of the intensity of light may occur on a specific subject by reflections of light within the contour depending upon the lighting, or a given subject of natural images may often include complex hues. In the method (b) for determining differences between frames, a specific subject cannot be detected at a high accuracy since a background or the other background included in a recess may also be detected if the specific subject includes the recess.

It is therefore an object of the present invention to provide an image separating points detecting method and an image separating system which overcomes the above mentioned problems of the prior art, the method and system being capable of precisely extracting a given subject in images and detecting separating spots.

In order to accomplish the above mentioned object, in the present invention, there is provided a method for detecting image-separating points where only a given subject image is separated from images, comprising the steps of: a first step for firstly displaying on a screen a plurality of candidate points in the vicinity of a boundary of the given subject image, which are input by a user; a second step for determining and displaying a smooth curve which connects the plurality of candidate points; a third step for determining the intensity of light on a straight line normal to the curve in each of the plurality of the candidate points; a fourth step for correcting the positions of the candidate points based upon the rate of change in the intensity of light determined in each of the candidate points; and a fifth step for determining and displaying a smooth curve passing the corrected candidate points. The method preferably includes the further steps of: individually processing the same image in each of components having different wave lengths by using the third and fourth steps; determining the positions of the corrected candidate points for each component; calculating the position of one corrected candidate point from a plurality of corrected candidate points after processing of said fourth step; performing a sixth step for determining the final position; and thereafter performing the fifth step. When the rate of change in the intensity of light is determined in the fourth step, the designated values of the threshold parameters for determining the rate of change for detecting an edge are changed. When a smooth curve connecting the plurality of candidate points is determined in the second step, the position of at least one of the candidate points is preliminarily fixed and processing in the third and fourth steps is stopped for the fixed candidate point, while processing of the second to fifth steps is performed for the other candidate points. In the fourth step, processing for determining the rate of change in the intensity of light is sequentially performed from the external to internal slide in each candidate point on a coarse curve traced in the vicinity of the contour of the subject, and a point which satisfies the conditional formulae representing that the rate of change for correcting the plurality of candidate points is higher than a threshold is determined to be the position of the corrected candidate point. After processing of the fifth step, the threshold of the rate of change is desirably changed for at least one candidate point in which a point which satisfies the conditional formulae as a result of the determination of the rate of change in light intensity in the fourth step and then the processing of the third to fifth steps is repeated at least once. If processing is repeated again from the second step after completion of the fifth step, at least one candidate point is fixed and the third and fourth steps are stopped for the fixed candidate point and each processing of the third, fourth and fifth steps is repeated at least once from a point adjacent to selected point for the other candidate points. The process preferably further includes determining a candidate point input in the first step to be located in the position of corrected candidate point; and adding the candidate point with an attribute representing that it does not satisfy the conditional formulae for correcting the position, including displaying the candidate point in a color different from that of the other point on the screen. The process preferably further includes determining a candidate point input in the fourth step be located in the position of the corrected candidate point; and adding the candidate point with an attribute representing that it does not satisfy the conditional formulae for correcting the position, including displaying the candidate point in a color different from that of the other point on the screen. In another aspect of the present invention, there is provided an image separating system for separating a given subject image from other images, comprising: means for determining a coarse contour curve for the given subject image which is desired to be separated; means for determining a plurality of candidate points on said contour curve; means for correcting the position of each of said candidate points in each spectral component based upon the rate of change in light intensity of each spectral component; means for comparing the candidate points corrected in each spectral component with each other; means for specifying separating points from the results of comparing; and means for separating the image from the specified points.

The present invention provides steps for selecting the position of a contour of a given subject image which seems to be most accurate based upon the conditions and environment by inputting a plurality of candidate points in the vicinity of a boundary between the given subjective image and a background.

In other words, (1) a plurality of points for detecting the edge shape in a subject are firstly specified. (2) Then, a user specifies plural points among the above-specified plural points for detecting the edge including at least one candidate point, changes the parameters for determining the edge positions in these points, or fixes the edge positions. (3) A smooth curve passing the candidate points for inferring the direction of the edge to be detected is determined. (4) The edge position is determined based upon the intensity of light of the image and the rate of change thereof in a direction normal to the curve in each candidate point is determined. In case of multi-spectral image, the edge position is determined for each of red, green and blue components. (5) The error of the position of the edge of each color component is corrected in accordance with the degree of the rate of change in light intensity and the candidate points are placed on the corrected positions of the edge and the original candidate points are left unchanged for the points where the edge cannot be detected or corrected or for the points the positions of which are preliminarily fixed. (6) After completion of a series of the processings, the user specifies one or more candidate points, changes the parameters for determining the edge position in the points or fixes the edge position, and detects the edge so that the contour of the specific subject to be separated is deformed by placing the candidate points on the corrected edge positions.

In such a manner, a contour can be automatically determined by successively determining the edge of a given subject to be separated using the most suitable color information in each candidate point. It is possible to determine the candidate points depending upon various conditions and environment which are specific for the natural image by specifying where it is difficult to determine the contour and by changing the parameters. Although the contour of the subject is finally determined along the entire circumference thereof in such a method, the contour, the shape of which is so complicated that the accuracy of the separation of the contour by the automatic separating processing seems to become adverse is manually determined by an interactive processing. Since separation of the contour having a simple shape can be completely automated, a load upon an operator can be reduced and a given subject surrounded by the contour line can be extracted highly accurately.

DESCRIPTION OF THE PREFERRED EMBODIMENTS

Embodiments of the present invention will now be described with reference to the drawings.

Figure 1:
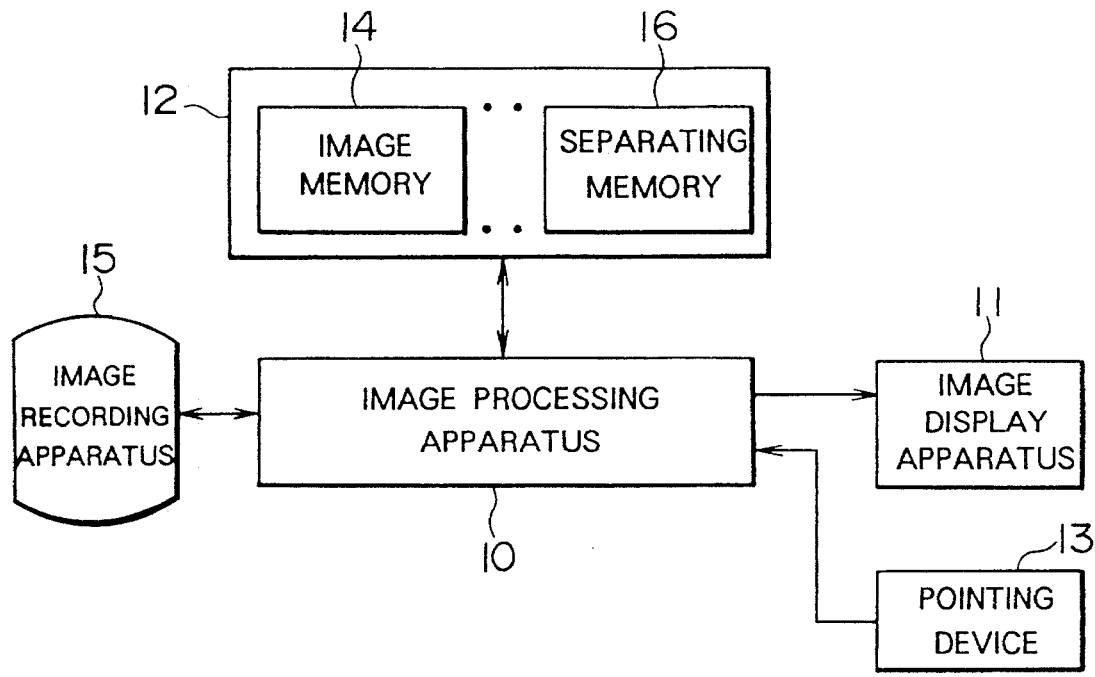
FIG. 1 is a block diagram showing an embodiment of an image editing system of the present invention.

FIG. 1 is a view showing the whole structure of an image editing system of the present invention. In FIG. 1, reference numeral 10 denotes an image processing apparatus; 11 an image display apparatus for displaying an image which is being processed or which is a result of processing; 12 a memory unit having a high capacity for storing images; 13 a pointing device for designating the coordinate in the displayed image; 14 an image memory included in the memory unit 12 for storing a two-dimensional digital image; 15 an image recording apparatus in which a number of images picked up by a television camera and the like are stored; and 16 a separating memory included in the memory unit 12 similarly to the memory 14 for storing a result of processing in the image processing apparatus.

Image data which are sequentially read from the image recording apparatus 15 are stored in the image memory 14 as digital data. A user instructs the image processing apparatus to perform the designation of the coordinates in candidate points and different processing in predetermined candidate points by inputting positions by using the pointing device 13. Positioning of processing for detecting the image separating points can be achieved by an intuitive operation to directly designate the positions in the displayed image by using the pointing device 13.

The user first reads first image from the image memory 14 and inputs the coarse contour of an image which the user desires to separate while looking at the position on the image display apparatus 11. The image processing apparatus 10 will then commence an automatic operation to perform the image separating point detecting processing on the basis of given coarse contour information. After the separation of a subject from the two dimensional digital image which is read from the image memory 14 is completed, the image processing apparatus 10 stores the result in the separating memory 16. The subject separating step determines each coordinate on the external contour line of the image to be separated by interpolating the image separating points which are a set of the determined separating points with a linear line or a smooth curve. Then the image inside or outside of the external line is then separated on the basis of these coordinates. The separating processing can be easily realized by using a method which is described in detail in, for example, an article "Scanline Conversion of a Polygon (2)" PIXEL No. 16, pp. 136–141, January 1984.

The present embodiment performs the image separating point detecting and image separating process and is not limited only the above mentioned method.

The user can designate the separating points in the displayed image and cope with the image conditions and environmental versatility.

Figure 2:
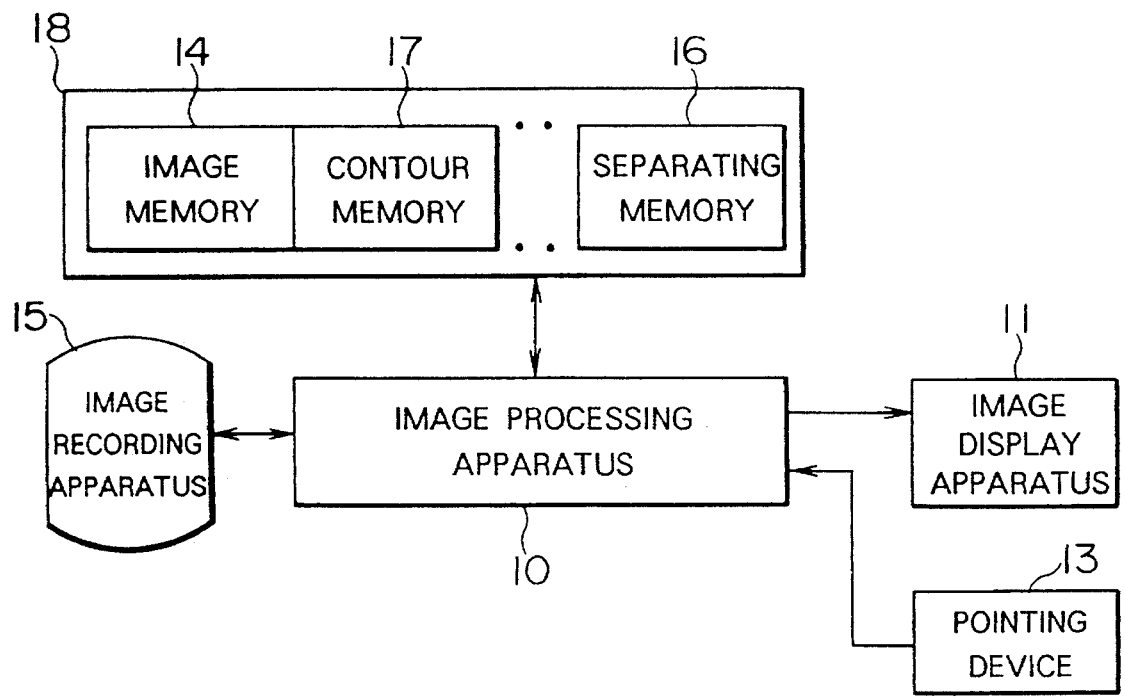
FIG. 2 is a block diagram showing an embodiment of an image separating system of the present invention.

FIG. 2 is a block diagram showing the whole of another embodiment of an image separating system of the present invention.

The embodiment of FIG. 2 is substantially identical with that of FIG. 1 except that the memory unit 18 includes three memories such as an image memory 14, an separating memory 16 and a contour memory 17 in the embodiment of FIG. 2, while the memory unit 12 includes two memories such as the image memory 14 and the separating memory 16 in the embodiment of FIG. 1 and that a coarse contour is temporarily stored in the memory unit 18 in FIG. 2 while it is temporarily stored in a buffer memory in the image processing apparatus 10.

The contour memory 17 holds the values of coordinates of the coarse contour. In other words, the contour memory 17 is an alternative area for inputting the coarse contour which has been provided by using the pointing device 13 in FIG. 1. These coarse coordinate values are prepared by using the image processing apparatus 10 for the image read out from the image memory 14. A linear operation among pixels which is a prior art method can be used for extracting a coarse contour.

Since use of such an arrangement makes it possible to automatically provide the image processing apparatus with the coarse contour which was determined by the previous processing, the operation imposed upon the user for a large quantity of image such as movie image can be reduced, and the image can be separated with high precision.

Figure 3:
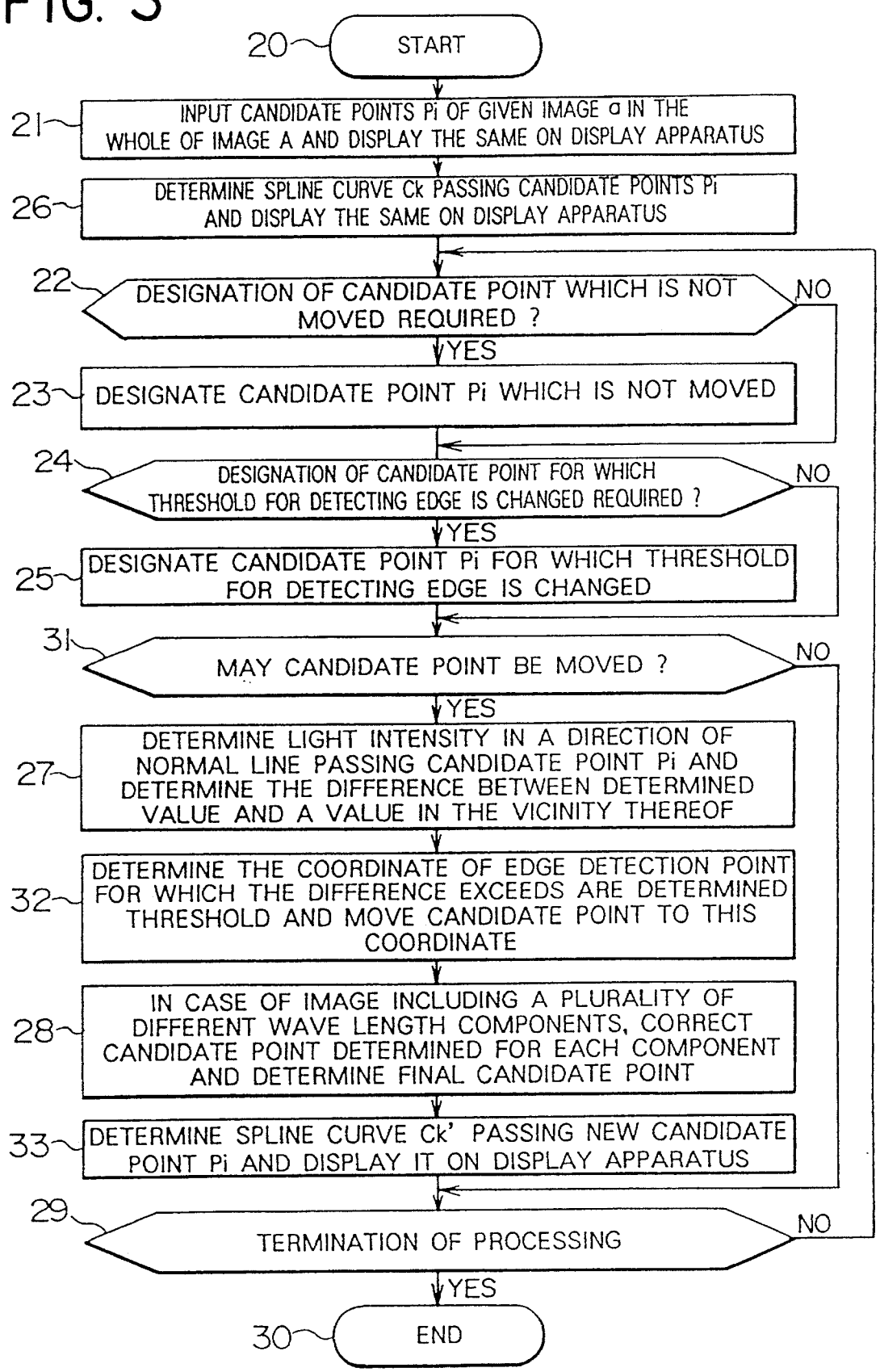
FIG. 3 is a flow chart showing a process for detecting image separating positions of the present invention.

FIG. 3 is a flow chart showing an operation of the image separating point detecting method in accordance with the present invention. FIGS. 4A through 4D are views illustrating the operation for detecting the image separating points with reference to a mono-color gray level image for easy understanding of a color image. FIGS. 4A through 4D show the distribution of the light intensity in a normal direction of a contour curve and edge detection in the candidate points when the image separating points are detected and changes in spline curve based upon the detection results in the corrected candidate points.

Figure 4A:
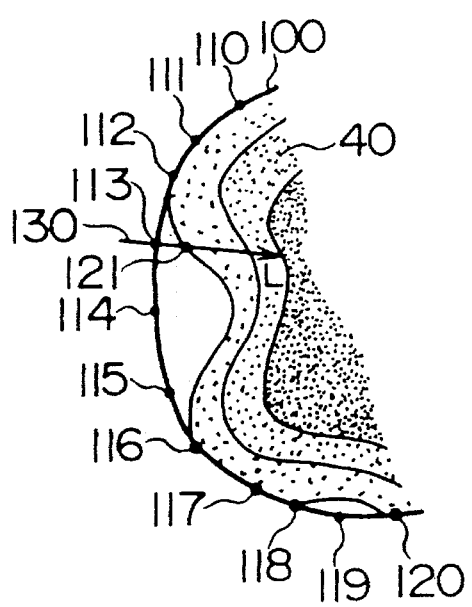
FIGS. 4A through 4D are views which are useful for illustrating the distribution of the intensity of light in a normal direction of a contour curve and a process of detecting edges of the present invention.
Figure 4B:
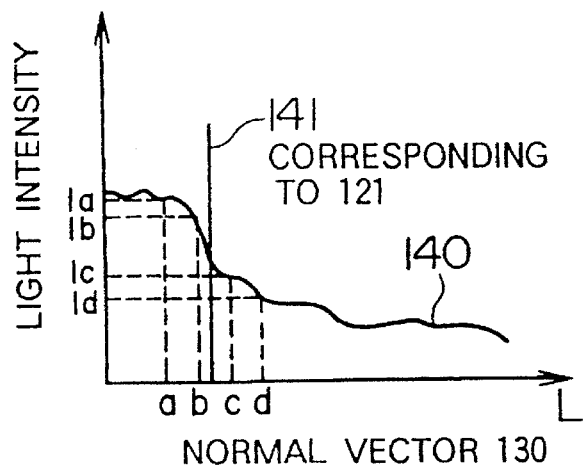
Figure 4C:
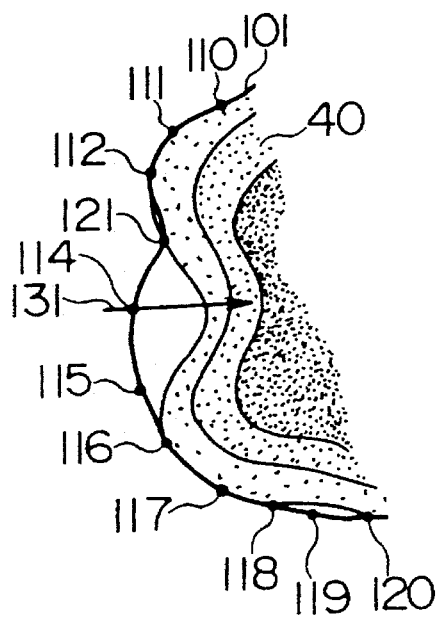
Figure 4D:
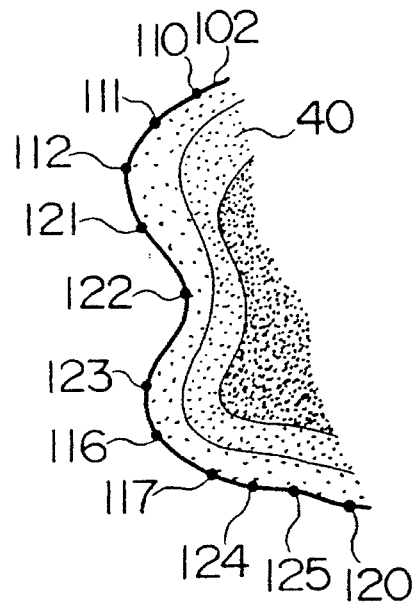

It is a final goal of the image separating point detection to determine the contour 102 of a given subject image as shown in FIG. 4D at a high precision and to separate the subject image 40 on the basis of this.

To this end, after the whole of an image is firstly displayed on the image display apparatus 11, the candidate points of a subject image 40 are designated by using the pointing device 13 and coordinates of the candidate points are input into the image processing apparatus 10 for displaying them on the display apparatus as shown in FIG. 3 (step 21). For example, a part of the contour of the subject image 40 and 11 initial candidate points 110 to 120 are designated and these coordinates are input as shown in FIG. 4A. Then, a spline curve 100 passing through the candidate points 110 to 120 is determined as shown in FIG. 4A (step 26). The curve 100 is traced to pass through a plurality of positions which are firstly designated. The shape of the curve is changed by being consecutively corrected as will be described hereafter. For a portion of the curve which the user determines to be difficult to perform detection and processing for in view of the state of the image, the initial candidate points are fixed by using the pointing device 13 according to needs (steps 22 and 23), or parameters of the separating points detection are changed (steps 24 and 25). Operation of changing the parameters specifically includes designating the candidate points where the thresholds of the edge detection are changed. In order to perform the additional designation, it is convenient to use a pop-up type menu (for example, a display illustrated in the left and upper side of the screen in FIG. 9A) which is used in the graphical user interface, etc.

When the curve is consecutively corrected to change its shape, determination is first made for each candidate point. Determination is made as to whether or not a candidate point is to be subject to movement (step 31). If there is no candidate point to be subject to movement, the desired curve 102 as shown in FIG. 4D has been obtained. Accordingly, the processing is terminated. If there are some candidate points to be subject to movement, correction as shown in FIGS. 4A to 4C is made. A graph 140 in FIG. 4B shows the relation between the normal vector 130 passing through the candidate point 113 on the contour in FIG. 4A and the intensity of light of an image through which the normal vector 130 passes wherein the normal vector is represented in abscissa and the light intensity is represented in ordinate. At this time a difference between the intensity of light in the position of the candidate point 113 and that in the vicinity thereof is determined (step 27). In other words, the intensity of light of the subject image 40 in a direction from an external position to internal position along the normal vector 130 passing through the candidate point 113 of the spline curve 100 passing through the initial candidate points is determined. FIG. 4B shows the relation between the coordinates of the light intensity and the normal vector. In FIG. 4B, an edge is detected from the rate of change in light intensity in coordinates in a given region along the normal vector 130 and is determined as an image separating candidate point. The determination condition of the edge satisfies three formulae as follows:

$$|Ia-Ib|<T_{ave} \qquad (1)$$

$$|Ic-Id|<T_{ave} \qquad (2)$$

$$|Ib-Ic|>T_{edge} \qquad (3)$$

where $T_{ave}$ denotes the threshold representative of the smoothness of the light intensity of the image; $T_{edge}$ is the threshold representative of the rate of change in the light intensity; and a, b, c, d are pixels which are continuous on the normal vector 130 and Ix (x: a, b, c, d) is the light intensity of each pixel. |a| denotes the absolute value of a.

In FIG. 4B, a portion represented by a line 141 satisfies the conditions (1) to (3). The light intensity in the left side of a point corresponding to the line 141 is remarkably higher than that in the right side of the line 141. A value which is higher than the threshold representative of the smoothness of the light intensity and is higher than the threshold representative of the rate of change of the light intensity exists in a position between the higher level left side and the lower level right side. This position is the boundary of the subject, i.e. the position of a point 121. In order to detect an image separating point, the processing proceeds from the external area to internal area of the subject image 40 along the normal vector 130 as shown in FIG. 3. A first detected edge is made a candidate point 121 of the image separating point (step 32). Then, the candidate point 121 is made a new candidate point and a new spline curve 101 passing through this position is defined and is displayed on the display apparatus (step 33) as shown in FIG. 4C. Then, processing is performed along a normal vector 131 passing through the adjacent candidate point 114 as is similar to processing for the normal vector 131.

Figure 5A:
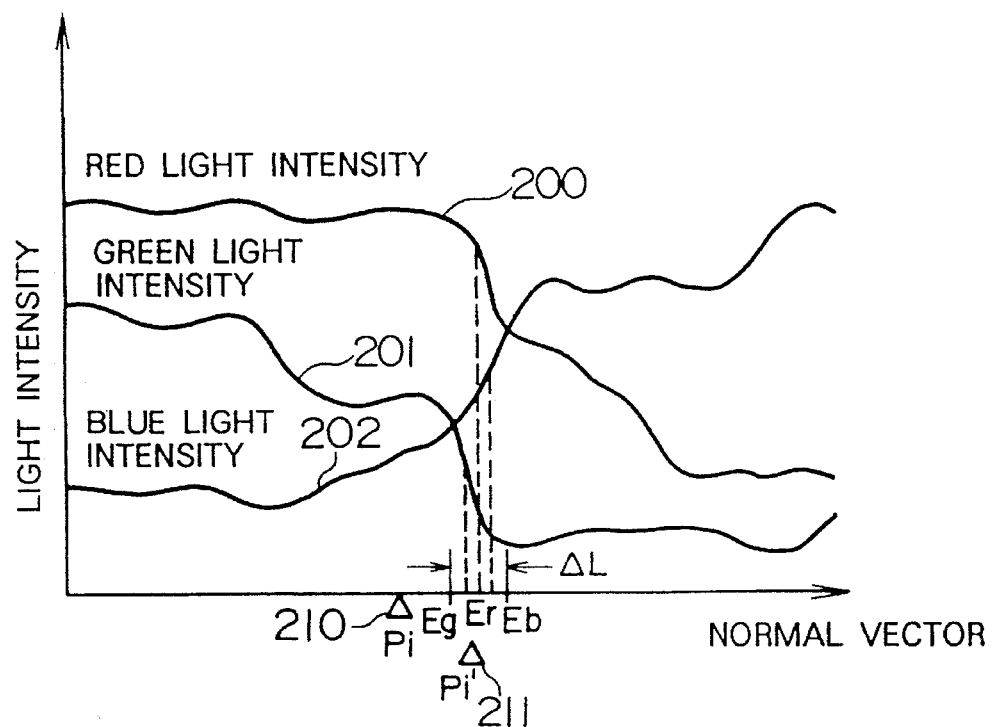
FIGS. 5A through 5C are views useful for explaining a process for determining the edge position from the light intensity and the rate of change thereof for each color component in the present invention.
Figure 5B:
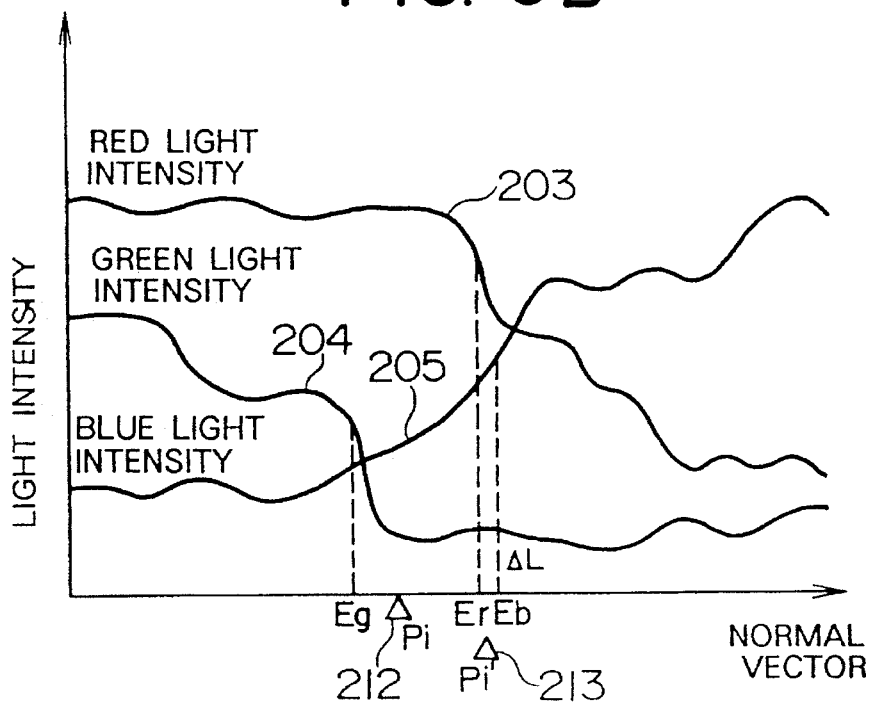
Figure 5C:
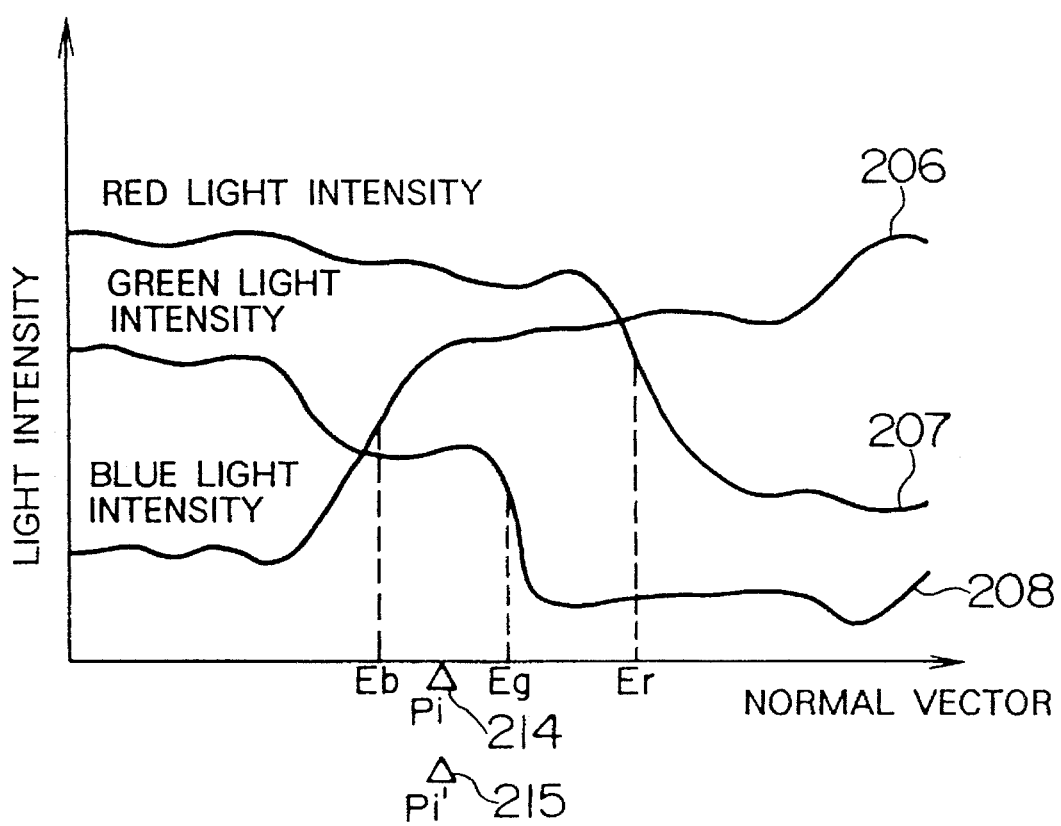

If the image is a multi-color image, this processing is performed for each spectral component (step 28) as shown in FIGS. 5A to 5C. If the image is a mono-color gray image, step 28 is omitted.

The above mentioned processing is consecutively repeated for the candidate points 110 to 120 as represented by a spline curve 102 by repeating a return loop from step 29 of termination processing to the step 22. Thus, new candidate points 122 to 125 are determined and the spline curve is updated on the basis of these candidate points for calculating the candidate points of the image separating points.

The candidate points 110 to 112, 116, 117 and 120 are those initial candidate points that match with new candidate points. These points may be preliminarily designated by the pointing device 13 excepting the state of the subject image 40. Similarly, the threshold values $T_{ave}$ and $T_{edge}$ in the right terms of the formulae (1) to (3) may be designated as different values by preliminarily designating some of the initial candidate points so that the rate of change in the light intensity of a part of the subject image 40 is easily processed.

FIGS. 5A to 5C are graphs explaining step 28 in FIG. 3. The relationship between the edge detection for determining the positions of the candidate points for separating the contour of a multi-color image and the searching direction is illustrated.

In FIGS. 5A to 5C, the relation between the light intensity of each color component and the coordinate on the normal vector of a spline function passing the vicinity of the contour is shown as is similar to FIG. 4B. FIG. 5A shows a case in which all candidate points Er, Eg and Eb for separating the contour based upon the mono-color gray image of each of red, green and blue color light intensities 200, 201 and 202 exist in a range of a given length ΔL. In this case, the position Pi' (211 in FIG. 5A) of the candidate point which is corrected for contour separating is the position which is moved to an average coordinate of three candidate points from the initial candidate point 210. FIG. 5B shows a case in which two candidate points Er and Eb of the red and blue color intensities 203 and 205 exist in a given length ΔL and only the candidate point Eg of the green color intensity exists on side of this range. In this case, the position of the candidate point which is corrected for separating contour is the position which is moved to an average coordinate 213 of the two candidate points Er and Eb in the given length ΔL from the initial candidate point 212. FIG. 5C shows a case in which none of the candidate points Er, Eg and Eb of the red, green and blue color light intensities 207, 208 and 206 exists in a given length ΔL. In this case, the position Pi' (215 in FIG. 5C) of the corrected candidate points is a value of the initial candidate point Pi (214 in FIG. 5C).

FIGS. 6A, 6B and 7A, 7B show a method for determining the positions of the candidate points which are corrected for separating the contour when the edge of some or any of each color component is not determined. FIGS. 8A, 8B and 8C are flow charts showing a process for detecting the positions and calculating the coordinates of the candidate points which are corrected for separating the contour in the color image illustrated in step 28 in FIG. 3.

In FIG. 8A, the candidate point of the contour separation in each of three colors is detected (step 28a) and three points are in a predetermined range (step 28b). Accordingly, an average coordinate of three points is determined (step 28c). The candidate point in three colors is detected in case of FIG. 5B (step 28a). None of three points is close to each other (step 28b). Only the points of the red and blue color light components are close to each other. Accordingly, an average coordinate of the two points is obtained (step 28f). The candidate points in three colors are detected in case of FIG. 5C (step 28a). Since any of the three points is not close to each other (steps 28b and 28c), detection of the corrected position is impossible (step 28y). At this time, a first designated coordinate is selected (step 28h).

Figure 6A:
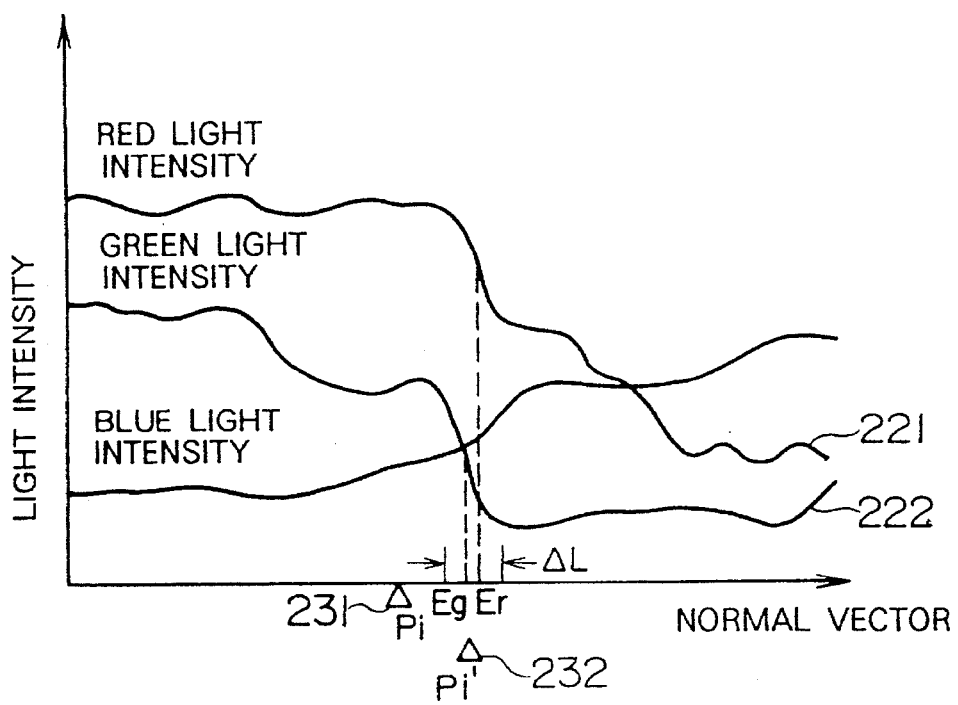
FIGS. 6A, 6B, 7A and 7B are views useful for explaining a process for determining the edge position from each color component, light intensity and the change rate which meet the threshold conditions.
Figure 6B:
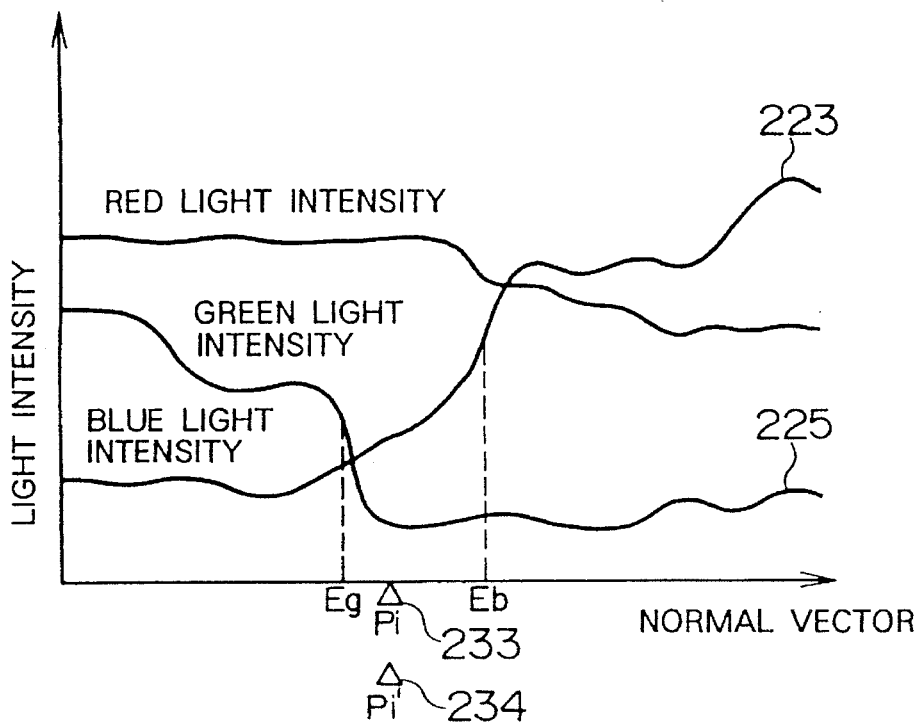

FIGS. 6A, 6B and 7A, 7B show a method for determining the corrected candidate points if candidate points cannot be selected in a part or any of the mono-color gray image. FIGS. 6A and 6B show a case where a candidate point of two components is determined. In other words, FIG. 6A shows a case where the determined candidate points are within a range of a given length ΔL. At this time, the position Pi' (232 in FIG. 6A) of the candidate point which is corrected for the contour separation of the initial candidate point 231 is an average coordinate of two candidate points Er and Eg of the red and green color light intensities 221 and 222. In a method of FIG. 8A corresponding to FIG. 6A, the candidate points of three colors are not detected, but the candidate points of two colors are detected (step 28d). Since these two points are close to each other (step 28e), an average coordinate of the two points is obtained (28f).

FIG. 6B shows a case where two candidate points, i.e. the candidate points Eg and Eb of the green and blue color light intensities 225 and 223 are not in a range of a given length ΔL. In this case, the position Pi (234 of FIG. 6) of the corrected candidate point is the coordinate of the initial candidate point Pi (233). In processing of FIG. 8A, two points of two colors are detected, but are not close to each other (step 28e). Accordingly, it is impossible to detect the corrected position (step 28y). The corrected position is the original designated coordinate (step 28h).

Figure 7A:
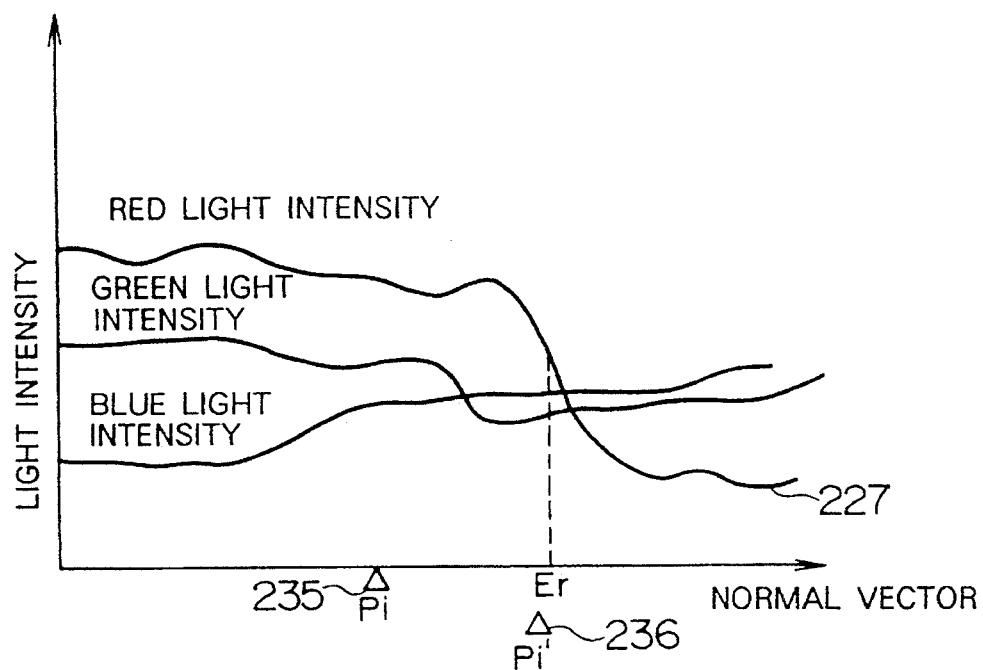
Figure 8A:
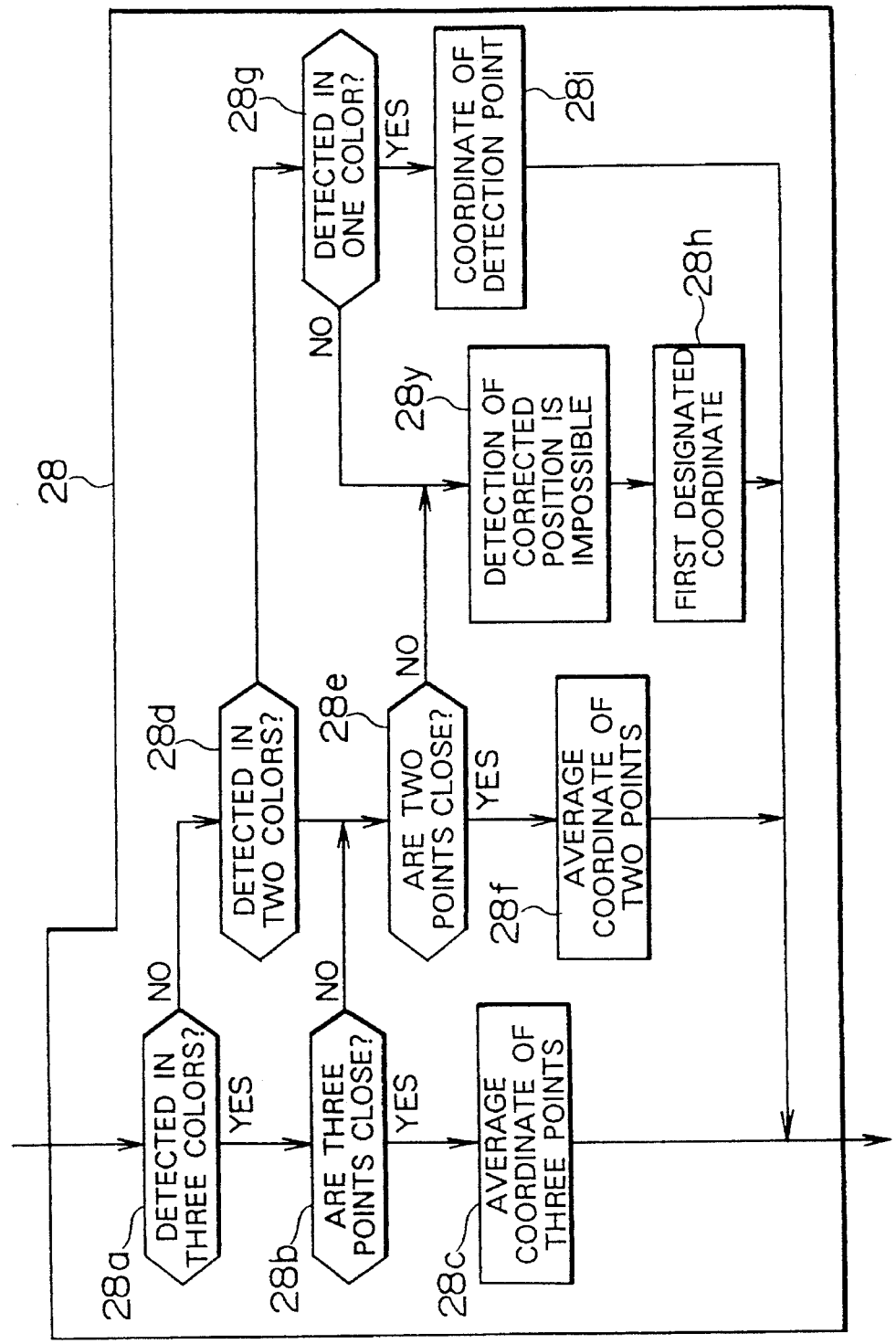
FIGS. 8A through 8C are flow charts showing an operation which is performed by using the edge positions determined from a plurality of color components.
Figure 8B:
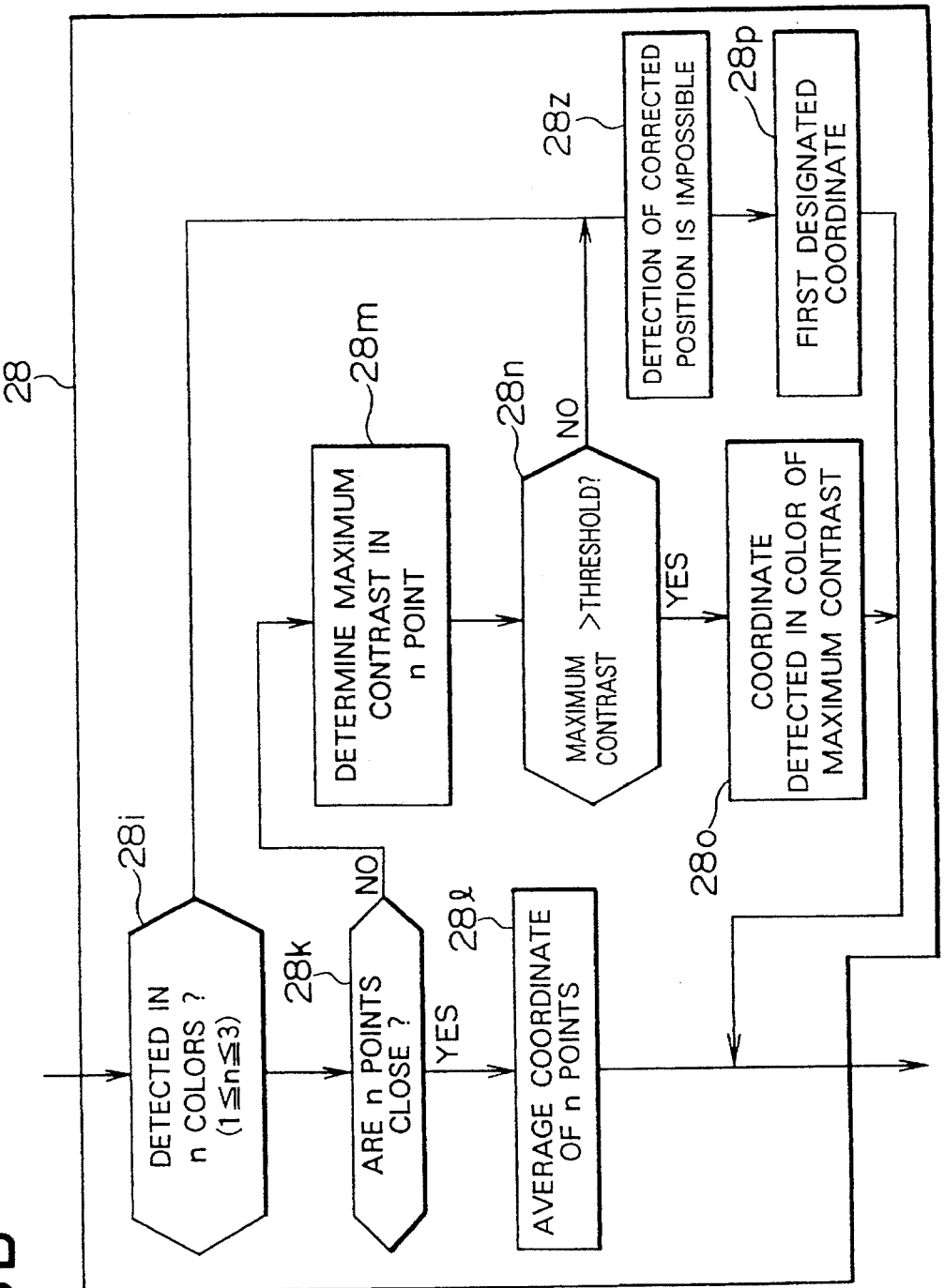
Figure 8C:
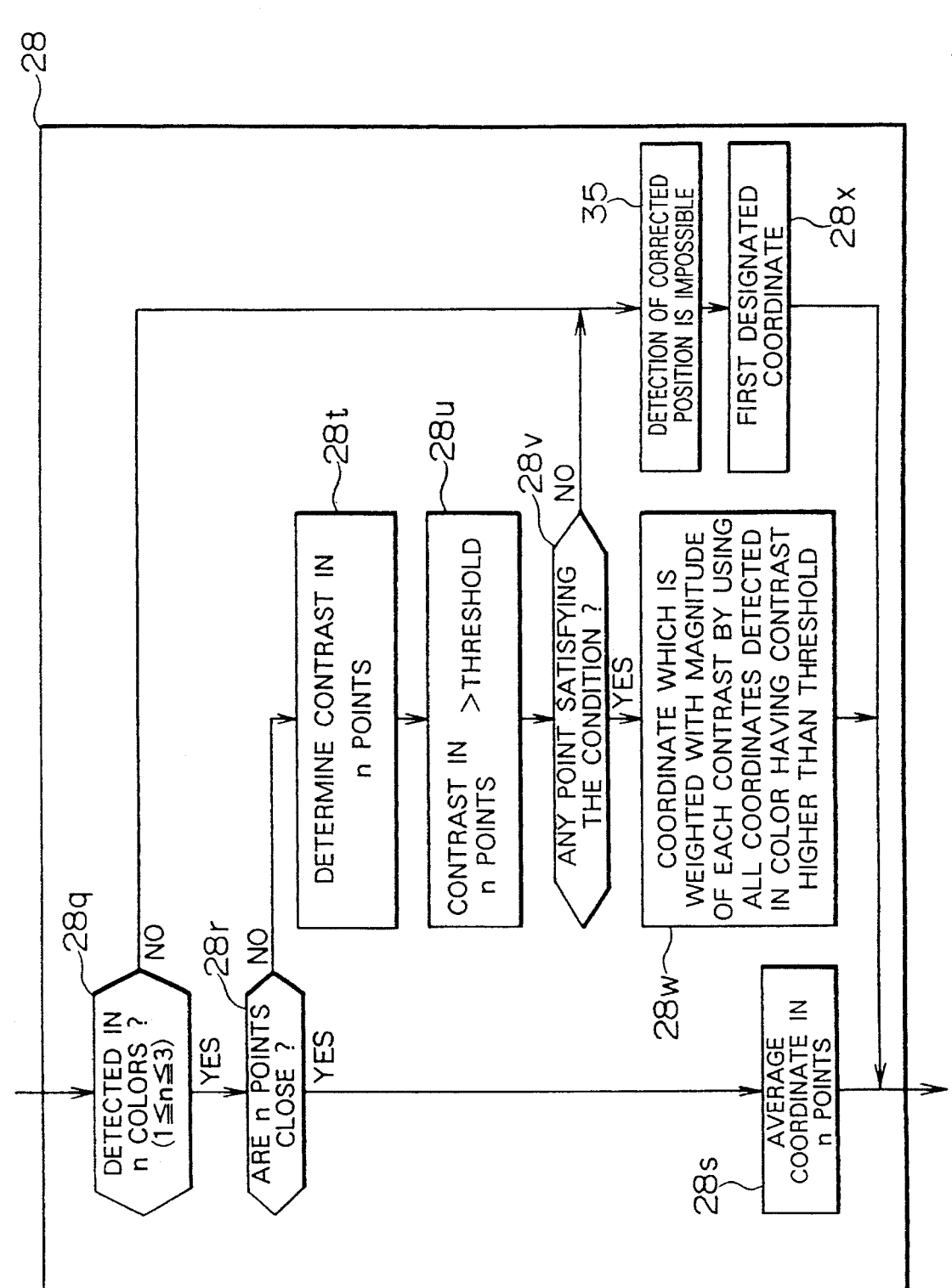

FIG. 7A shows a case where the candidate point of only one component is determined. In this case, the position Pi' (236 in FIG. 7A) of the candidate point corrected for the contour separation assumes the coordinate of the candidate point Er which is determined by the red color light intensity in position of the initial candidate point 235. In other words, since the position of one color is detected in processing of FIG. 8A (step 28g), the position of the candidate point is the coordinate in the detected point (step 28i).

Figure 7B:
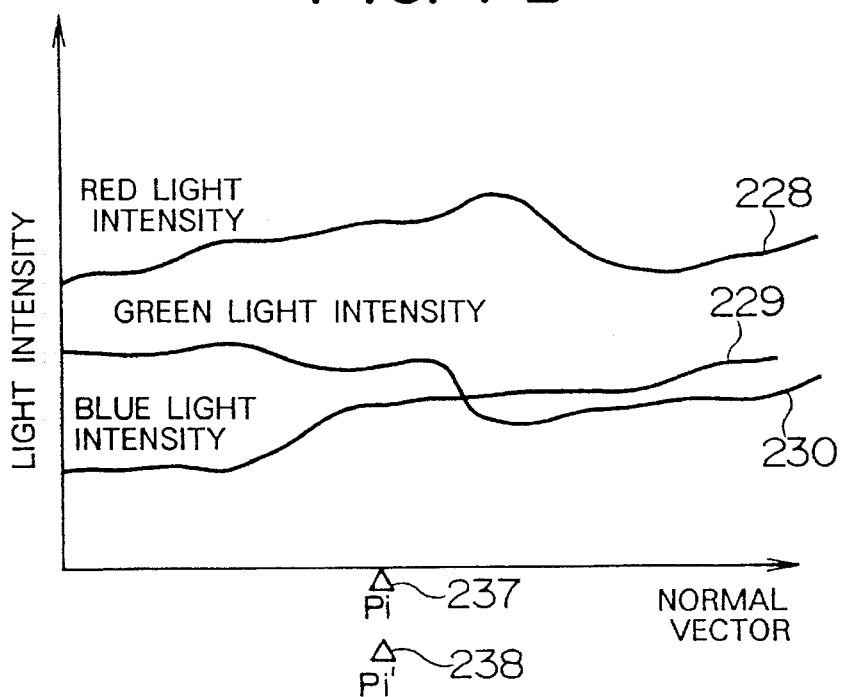

When no candidate point is obtained in all components of red, green and blue color light intensities 228, 229 and 230 as shown in FIG. 7B, the position Pi' (238 in FIG. 7B) of the corrected candidate point is the initial candidate point Pi (237). Since the corrected candidate point is not detected in three colors (step 28a), is not detected in two colors (step 28d) and is not detected in one color (step 28g) and it is impossible to detect the corrected position (28y) in FIG. 8A, the corrected position is the initially designated coordinate (step 28h).

An example is described with reference to primary color components. Combinations of the color components may be different if the contents of the color components are independent of each other. When detection of the candidate point is impossible in any case, the candidate point is the initial candidate point Pi of the original designated coordinate (step 28h in FIG. 8A). The length between coordinates is determined from ΔL in FIGS. 5A to 5C.

In FIGS. 8B and 8C, the certainty when the candidate point is evaluated by a value (magnitude of contrast) represented in the left term of the formula (3) in addition to information whether or not the candidate point in each color component is obtained. In FIG. 8B, determination of how many colors of three colors the correction position of the candidate point can be detected is made in accordance with this evaluation (step 28i). If no position is detected, it is determined that detection of the corrected position of the candidate point is impossible (step 28z) and the firstly given candidate point is output (step 28p). If the candidate positions can be detected in some colors, determination is made as to whether or not the corrected position of the candidate point determined in each color is in the range of a predetermined length ΔL (step 28k). If all of them are in the range of a predetermined length ΔL, an average coordinate of the corrected positions of the candidate points determined in these colors is output as a new candidate point (step 28l). On the other hand, if the corrected position of the candidate point determined in each color is not in the range of a predetermined length ΔL, the magnitude of contrast (rate of change in light intensity) which is a measure for detecting the corrected position of the candidate point for each detected color is determined (step 28m). Determination is made as to whether or not the highest contrast is higher than threshold representative of a predetermined magnitude of the rate of change in light intensity (step 28n). If it is lower than the threshold, it is determined that it is impossible to detect the corrected position of the candidate point (step 28z) and the firstly given candidate point is output (step 28p). If the contrast is higher than the threshold, the coordinate of the candidate point which is determined by the highest contrast is output as a new candidate point (28o).

In FIG. 8C, determination of how many colors of three colors the corrected position of the candidate point can be detected is made in accordance with this evaluation (step 28q). If no position can be detected, it is determined that detection of the corrected position of the candidate point is impossible (step 35) and the firstly given candidate point is output (step 28x). If the candidate points can be detected in some colors, determination is made as to whether or not the corrected position of the candidate point determined in each color is in the range of a predetermined length ΔL (step 28r). If all of them are in the range of a predetermined length ΔL, an average coordinate of the corrected positions of the candidate points determined in these colors is output as a new candidate point (step 28s). On the other hand, if the corrected position of the candidate point determined in each color is not in the range of a predetermined length ΔL, the magnitude of contrast (rate of change in light intensity) which is a measure for detecting the corrected position of the candidate point for each detected color is determined (step 28t). Determination is made whether or not the highest contrast is higher than threshold representative of a predetermined magnitude of the rate of change in light intensity (steps 28u, 28v). If it is lower than the threshold, it is determined that it is impossible to detect the corrected position of the candidate point (step 35) and the firstly given candidate point is output (step 28x). If the contrast is higher than the threshold, the coordinate of the candidate point which is detected by the magnitude of the contrast in each color is weighted to determine an average coordinate and is output as a new candidate point (28w).

FIGS. 9A to 9C, 10A to 10C, 11A to 11C, 12A to 12C, 13A to 13C show a method of operating the image display apparatus in FIGS. 1 and 2.

In FIGS. 9A to 13C, reference numeral 321 denotes a subject image which is an automobile in this embodiment; 320 denotes a cursor for indicating the pointing device 13 on the screen of the image display apparatus 11; 322 a pop-up type operation menu; 322a a button for starting the detection of the contour separating positions; 322b a button for designating termination of inputting of a coarse candidate point; 322c a button for designating the cancellation of inputting of coarse candidate point; 322d a button for designating the calculation of the candidate point of the separating point; 322e a button for preserving the coordinate of the candidate point; 322f a button for displaying the coordinate of the candidate point which has been preliminarily preserved; 322g a button for terminating the detection of the contour separating points; and 323 a display screen.

Figure 9A:
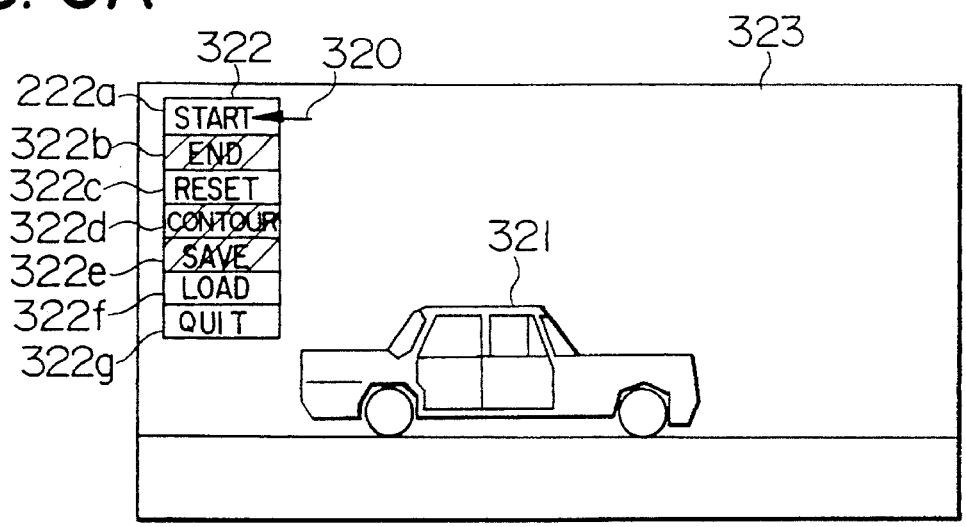
FIGS. 9A through 9C are views illustrating an operation method performed in a system for determining the image separating points in accordance with the present invention.
Figure 9B:
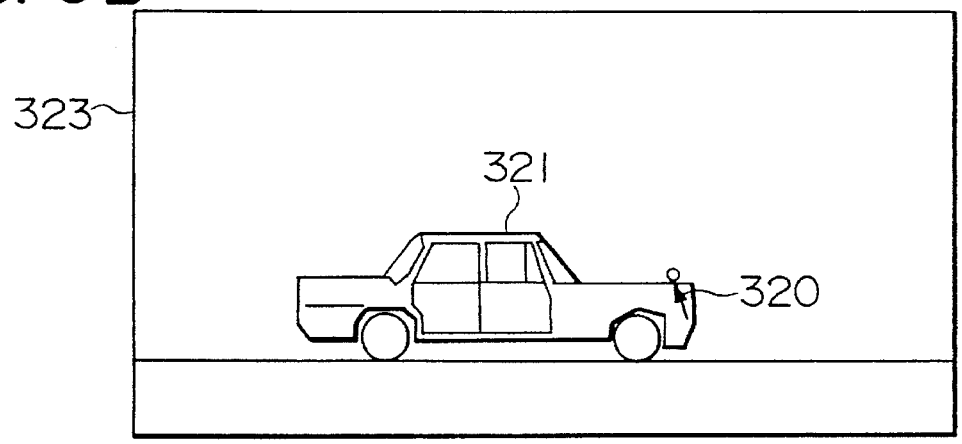
Figure 9C:
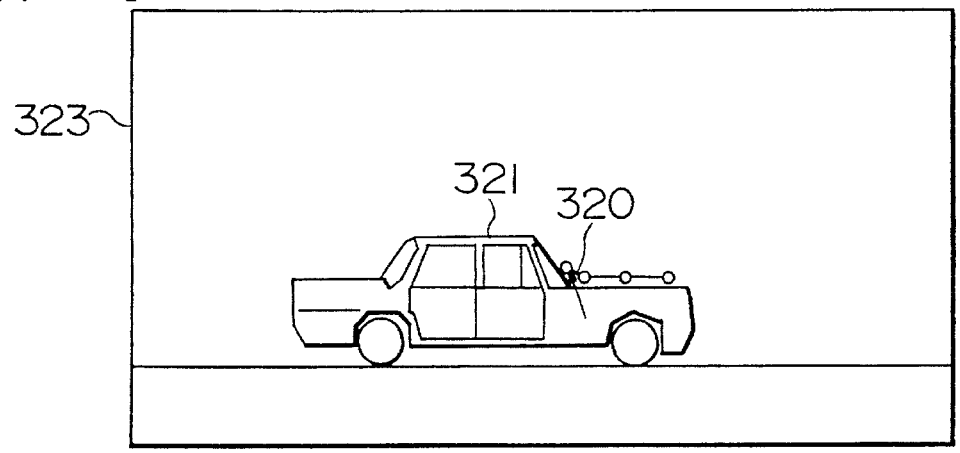
Figure 10A:
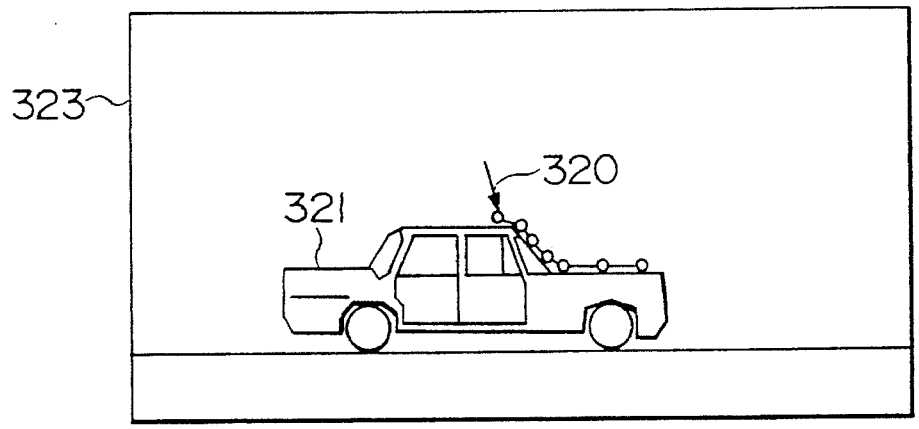
FIGS. 10A through 10C are views illustrating another operation method performed in the system for determining the image separating points in accordance with the present invention.
Figure 10B:
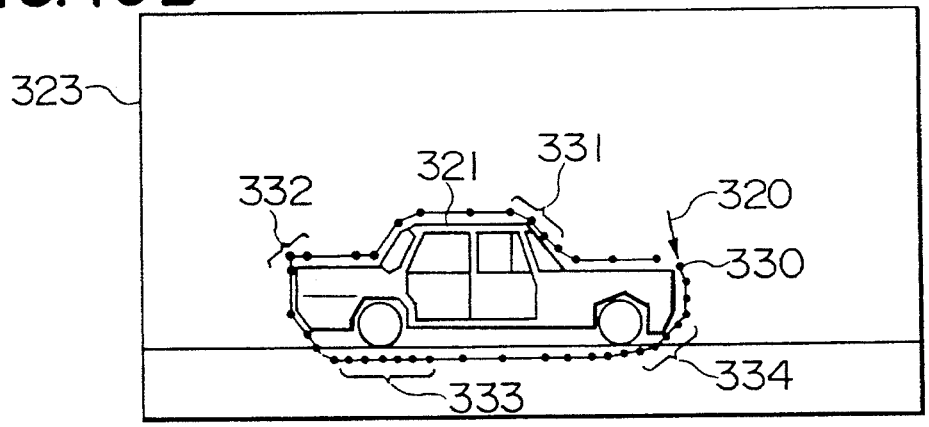
Figure 10C:
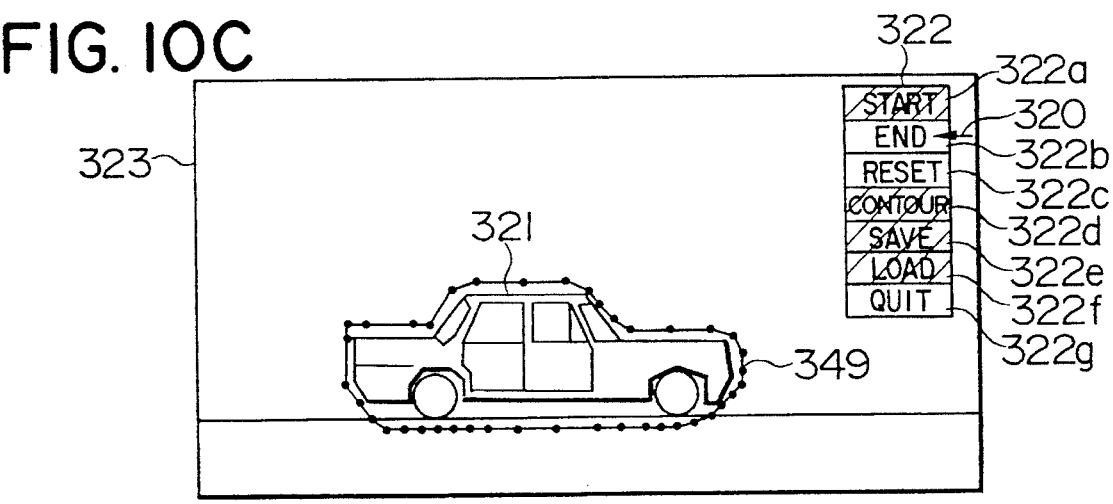

The subject image 321 is firstly displayed in the display screen 323 and a selection item 322a in the operation menu shown in FIG. 9A is selected with the cursor 320 (start). The operation menu 322 is displayed on the screen by outputting a menu display request signal to the image processing apparatus 10 from the pointing device 13. Selection of the menu is achieved by outputting an input request signal into the image processing apparatus 10 from the pointing device 13. The image processing apparatus 10 accepts the coordinate of the cursor 320 for executing an operation corresponding to the selected item in accordance with the coordinate. In order to avoid a wrong operation at this time, an input request signal from the selection item of unnecessary operation menu is not accepted and simultaneously, a fact that an input by the pointing device is not accepted is indicated to users by changing the colors of the selection item. In FIGS. 9A to 9C, the items 322b, 322d and 322e are displayed in different colors (as represented by hatching) to indicate rejection of input. The hatched areas are moved as the processing proceeds. After selection of the item, the operation menu 322 is erased from the display screen 323 by the image processing apparatus 10.

Figure 11A:
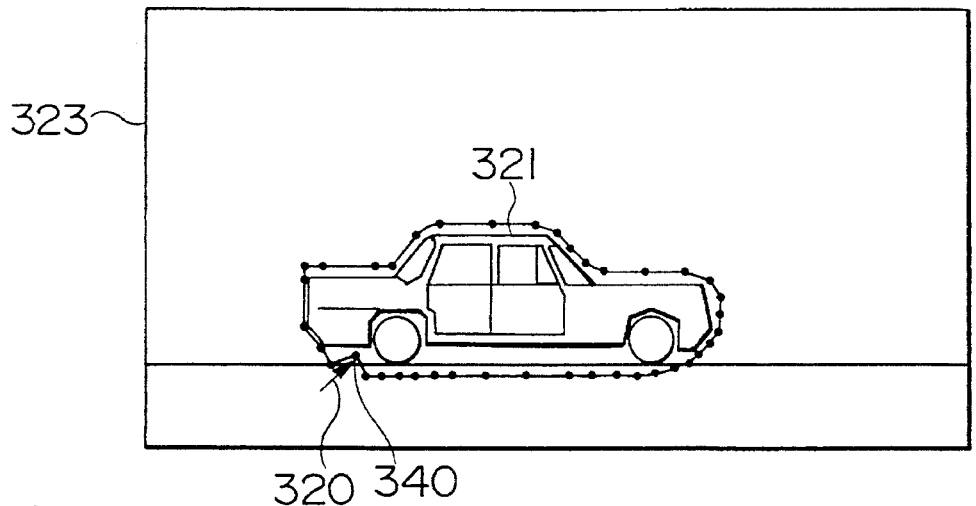
FIGS. 11A through 11C are views illustrating another operation method performed in the system for determining the image separating points in accordance with the present invention.

As shown in FIGS. 9B to 10B, a candidate point is input into a position in the vicinity of the contour of the subject image 321 by using the cursor 320. Input operation is achieved by inputting an input request signal into the image processing apparatus 10 from the pointing device 13. The image processing apparatus accepts the coordinate of the cursor 320. Since a spline curve 330 passing the candidate points in the order of input is displayed at the time of FIG. 10B, the users can be helped to better understand the coarse contour. In this case, candidate points are finely input for a portion of the contour of the subject image having a large curvature or change in curvature as represented by input candidate points 331, 332, 333 and 334. After inputting of a plurality of candidate points, the selection item 322b in the operation menu 322 is selected by using the cursor 320 (end) as shown in FIG. 10C. After selection, the image processing apparatus 10 displays a closed spline curve 349 which passes the plurality of candidate points in order of input together with the subject image 321 on the display screen 323. If the position of a candidate point is far from the contour, the user selects the candidate point by using the cursor 320 as shown in FIG. 11A to move the candidate point to a desired position 340, if necessary. This selection of a candidate point is achieved by inputting an input request signal into the image processing apparatus 10 from the pointing device 13. When the candidate point is in that position, the image processing apparatus 10 selects it, the movement is performed for a period of time during which the input request signal is continued to be output from the pointing device 13 if a subject to be selected exists. The image processing apparatus 10 accepts the coordinate indicated by the cursor 320 for displaying the candidate point in accordance with the coordinate.

Figure 11B:
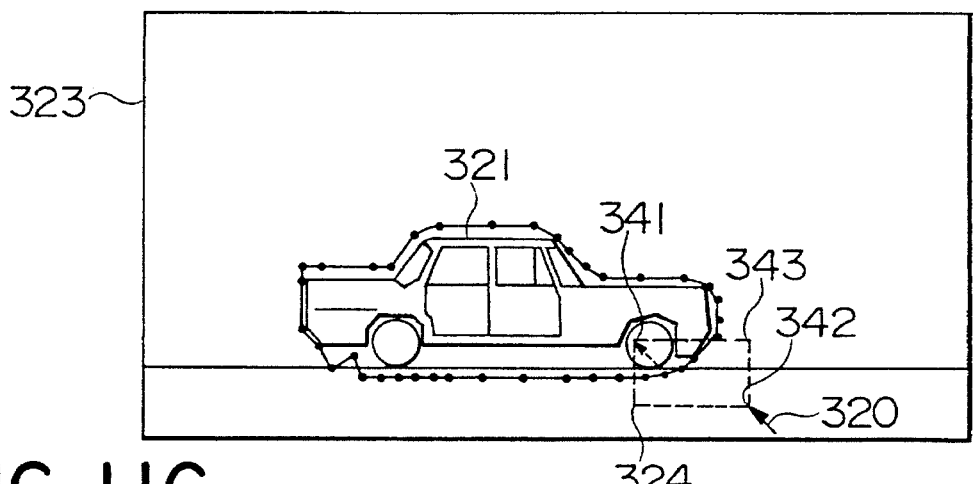

Operation shown in FIG. 11B is performed to change the parameters of the candidate point for detecting the corrected position. In other words, if the contour is complicated in shape, the user designates the range with a rectangular shape, in practice with two opposite ends of a diagonal line by using a cursor 320 in order to change the parameters of the candidate point. Since the tire of a front wheel is complicated in shape in this example, a diagonal line is designated in the two points by indicating the outer side of the tire after indicating the inner side of the tire. A firstly designated position 341 is displayed by a gray cursor 324 and the subsequently designated position 342 is displayed by a cursor 320. The cursor signals are input into the image processing apparatus 10 together with a range request signal from the pointing device 13. The coordinate of the firstly accepted cursor 320 is made as an starting point of the diagonal line of the rectangular shape and the coordinate of the cursor 320 while the range request signal being output is made an ending point of the diagonal line of the rectangular shape so that the rectangular shape is displayed on the display screen 323. The pointing device 13 outputs an input signal immediately after outputting of the coordinates of the rectangular area. If the external line 343 of the range of the rectangular shape is displayed in a different color when the rectangular shape is displayed, this will help the user briefly understand the designation of the range. In the figure, difference in color is represented by a dotted line.

Figure 11C:
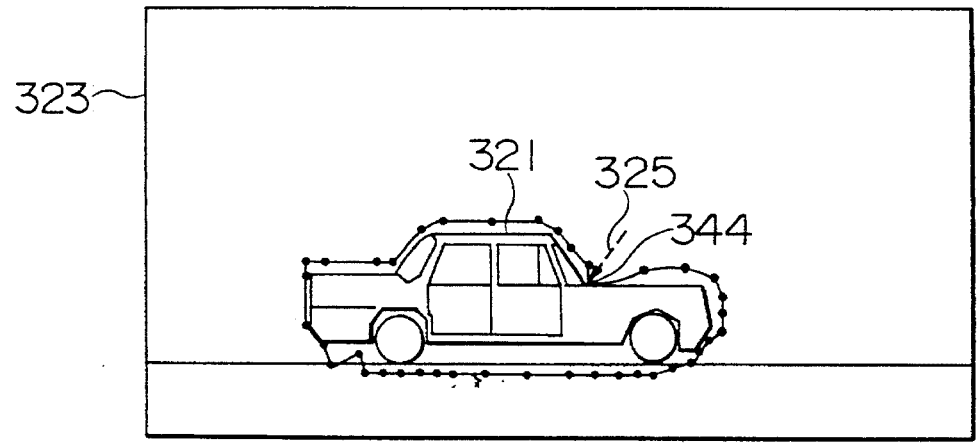

In such a manner, candidate points are displayed on and along the contour line of an automobile as shown in FIG. 11B. Only one candidate point is selected with the cursor 325 for a point which is desired to be preliminarily fixed so that, for example, the lower end of a front window is fixed and the cursor 325 is moved to the position 344 which is desired to be fixed as shown in FIG. 11C. Immediately after this movement, the candidate point is fixed by outputting a position fixing request signal from the pointing device 13 into the image processing apparatus 10. The image processing apparatus 10 adds the candidate point 344 located in the coordinate of the cursor 322 with an attribute representing that movement in the contour separating processing is not performed and changes the color of the candidate point 344 displayed on the display screen 323 for helping the user understand the designation of the position to be fixed.

Figure 12A:
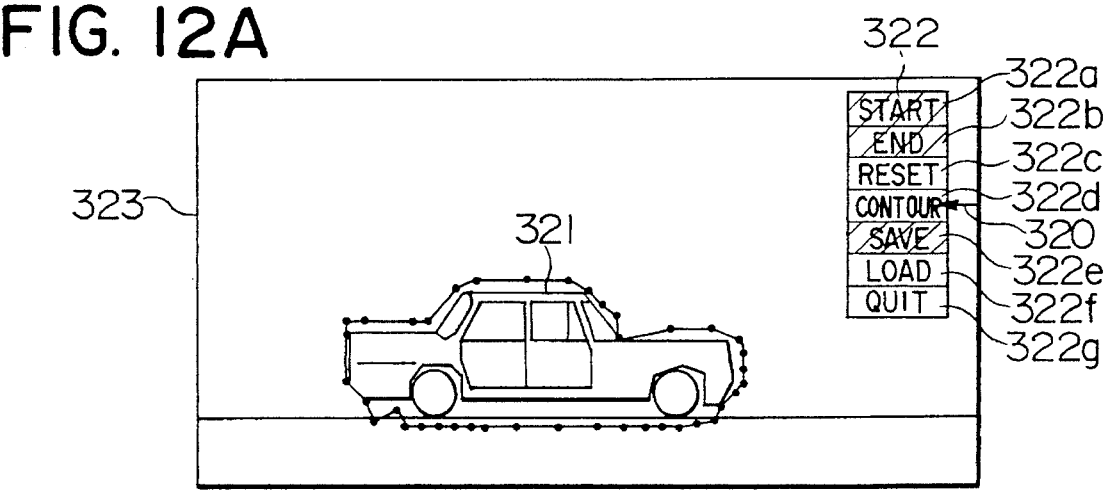
FIGS. 12A through 12C are views illustrating another operation method performed in the system for determining the image separating points in accordance with the present invention.
Figure 12B:
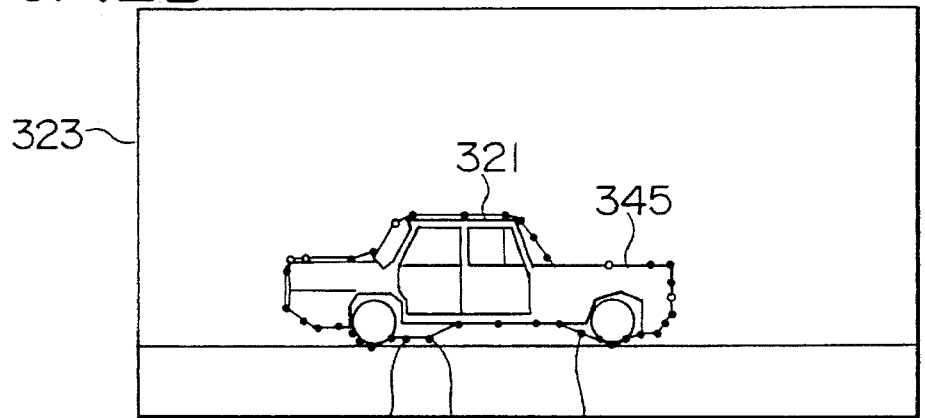
Figure 12C:
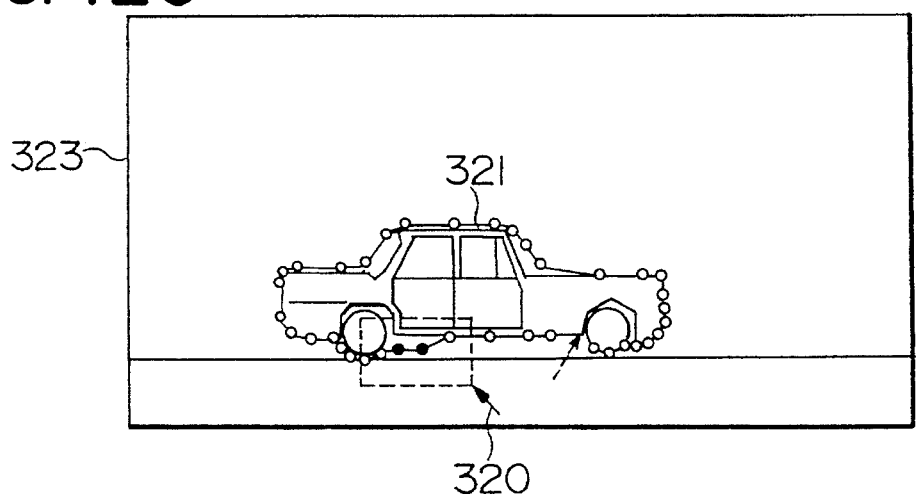
Figure 13A:
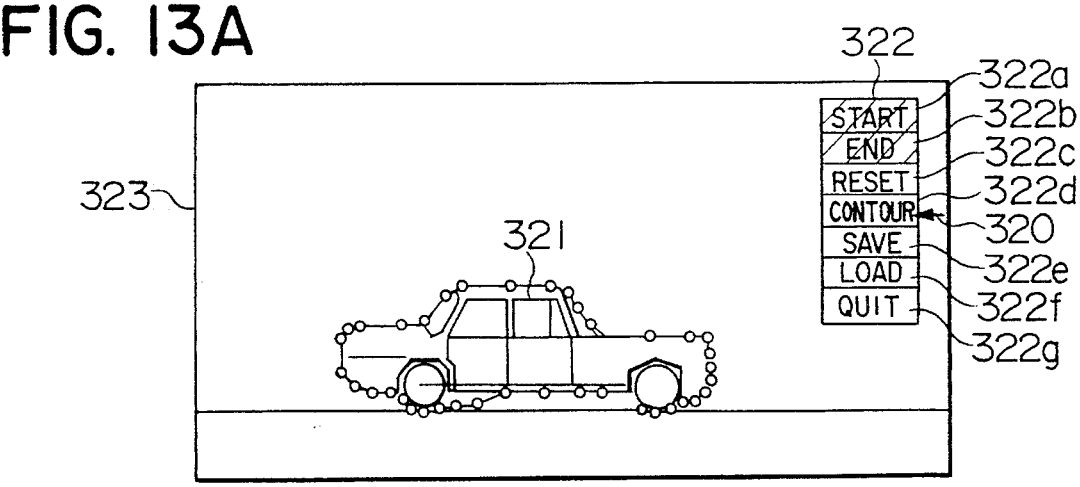
FIGS. 13A through 13C are views illustrating another operation method performed in the system for determining the image separating points in accordance with the present invention.
Figure 13B:
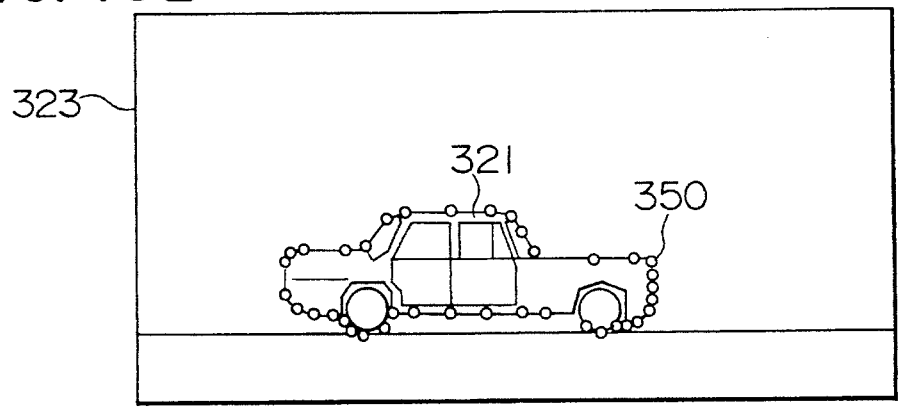

Then, in order to determine the separating position of the image, the operation menu 322 is displayed and a selection item of the menu is selected with the cursor 320 as shown in FIG. 12A. The selection item 322d is a button for designating execution of the calculation of the separating candidate point. If a problem occurs for some reason while the candidate points in FIGS. 9B to 12A are being input, the operation menu 322 is displayed and the input candidate points can be cancelled by designating the button 322c for cancellation. In order to preserve the coordinate of the input candidate point, the input candidate point can be preserved by specifying the button 322f for preserving the coordinate of the candidate point. The coordinate of the preserved candidate can be read out by specifying the button 322f for displaying the coordinate of the candidate point on the screen. Detection of the contour separating point can be terminated by the button 322g for terminating the detection of the contour separating position. If fixing of the positions of the candidate points and changing of detection parameters is carried out as described with reference to FIGS. 11A to 11C, the image processing apparatus 10 detects the image separating point by also using information obtained when the selection item 322d is selected. The result is displayed as a closed spline curve 345 passing a plurality of candidate points in order of input together with the subject image 321 as shown in FIG. 12B. In this case, a point whose corrected position is not detected is displayed in a different color for helping the user understand the image separating point. In lieu of indicating the portion which has not been detected in a different color, the candidate points which can be detected are displayed using white circles in FIG. 12B. After processing, candidate points in which the threshold for determining the image separating points is changed can be preset for the candidate points (346, 347 and 348) which are not detected by performing the same operation as shown in FIG. 12C. Thereafter, processing for detecting the image separating point is carried out again from this state by performing the same operation as FIG. 12A as shown in FIG. 13A if necessary. As a result of this, the image separating points which are a closed spline curve 350 that passes these points are displayed as shown in FIG. 13B.

Figure 13C:
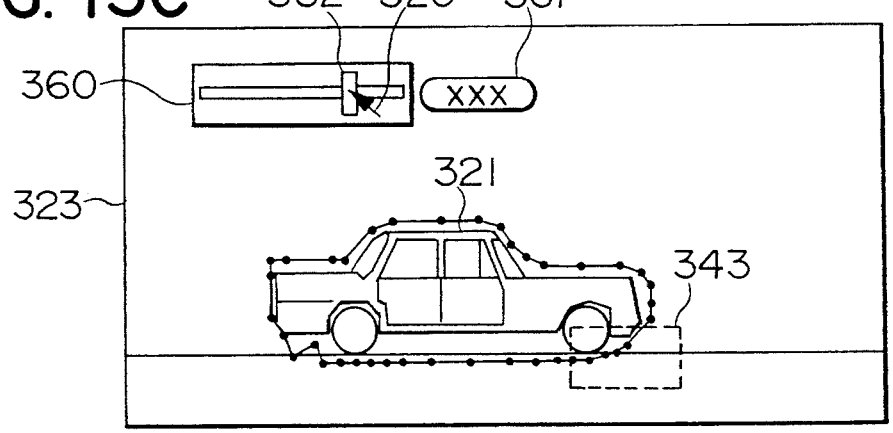

A slide bar and a digital indicator may be displayed together with the rectangular shape so that the parameters can be clearly read if the parameters are increased or decreased in FIGS. 11B and 12C. The image processing apparatus 10 displays a slide bar 360 which is shown in FIG. 13C. The slide bar 360 indicates an increase or decrease in parameters of threshold which are to be changed in the rectangular shape 343 by the amount of slide. While the coordinate of the cursor 320 reflecting the pointing device 13 on the screen 323 matches with the coordinate of the slide bar 360 and a movement request signal is continued to be output from the pointing device 13 to the image processing apparatus 10, the image processing apparatus 10 displays a bar 362 of the slide bar 360 at the same position as the cursor 320 reflecting the coordinate of the pointing device 13 on the screen 323. At this time, the image processing apparatus 10 increases or decreases the parameters depending upon the coordinate moved by the pointing device 13 and displays the state of the parameters on a panel 361. In this case, the range request signal which is output from the pointing device 13 may be the same as the signal for moving. In this case, determination of the signal is made in current input state in the image processing apparatus 10.

Figure 14:
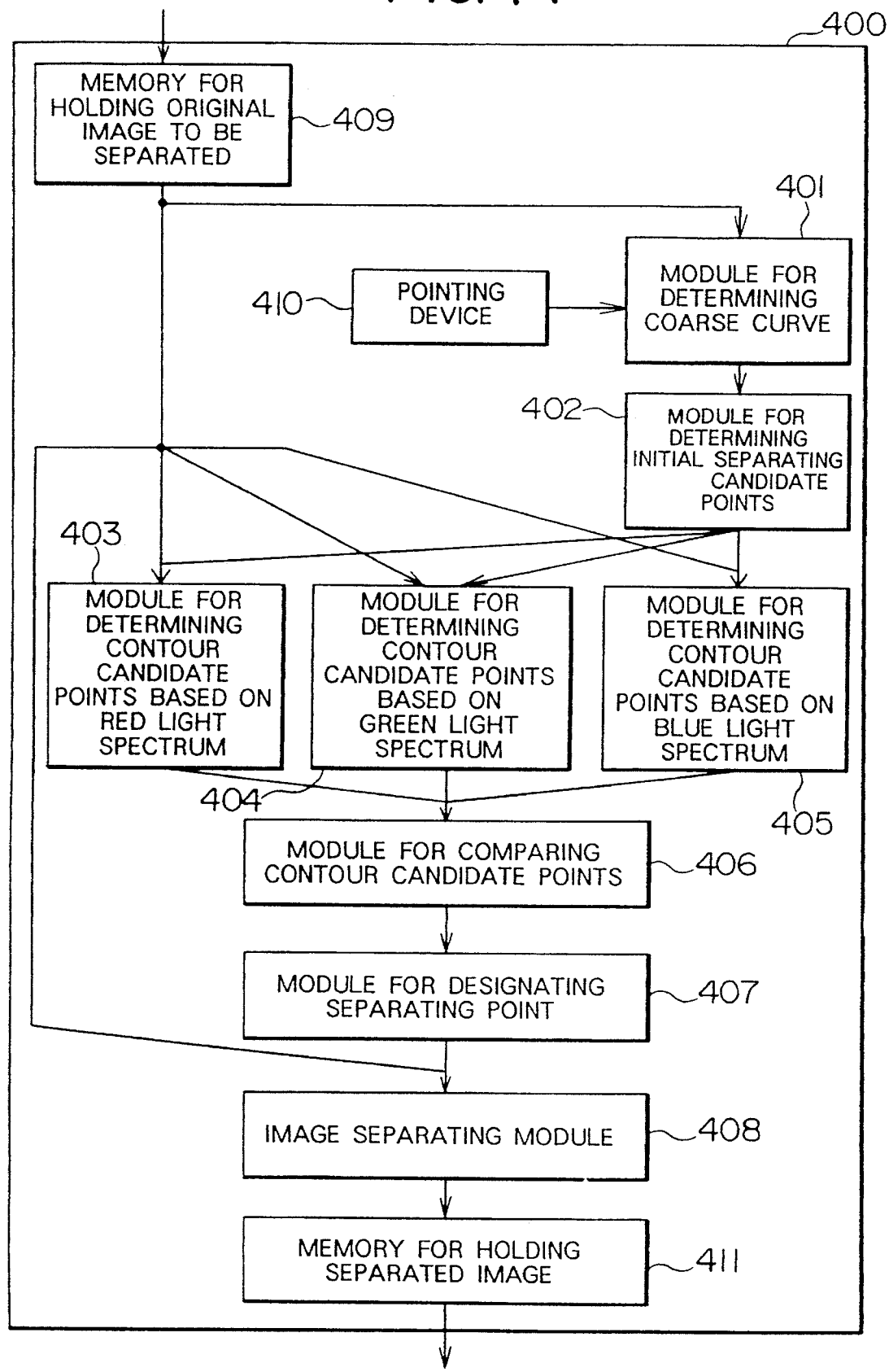
FIG. 14 is a block diagram showing an embodiment of an image separating system of the present invention.

FIG. 14 is a block diagram showing an embodiment of an image separating system of the present invention. In FIG. 14, reference numeral 400 denotes an image separating apparatus; 401 a module for determining a coarse contour curve; 402 a module for determining the candidate point of the initial separating point; 403 a module for determining contour candidate points based upon the red light spectrum; 404 a module for determining contour candidate points based upon the green light spectrum; 405 a module for determining contour candidate points based upon the blue light spectrum; 406 a module for comparing the contour candidate points determined based upon each color light spectrum with each other; 408 a module for separating an image from the specified separating points; 409 a memory for holding an original image which is an object to be separated; 410 a pointing device; and 411 a memory for holding a separated image.

A coarse contour curve and candidate points of an initial separation points are determined by the module 401 for determining a coarse contour curve with reference to an original image including a subject to be separated which is provided from the memory 409 and the module 402 for determining the candidate points of an initial separating points. The contour curve and the separating candidate points are determined by inputting the coarse contour curve in an interactive manner by a user if the subject to be separated is a still image. If the subject has a distinctive color, a coarse contour of areas of the color is determined. In the former method, a coarse contour curve or the candidate points can be input by using the pointing device 410 with reference to, for example, the original image of the memory 409. The latter method can be easily carried out by using, for example, a method which is disclosed in JP-B-2-4027, for example.

If the subject is a motion image, a coarse area of a changed or moved subject can be obtained by detecting the difference between two frames which are continuous in time from successive still images (each of which is referred to as frame) at intervals of a given unit time. This is possible since the background portion can be regarded as hardly changed in a short interval between frames. A coarse area of the motion image can be easily determined, for example, by a method disclosed in the above described article "Development of video surveillance system using motion information". The points on the boundary of the determined coarse area are made the initial separating candidate points. On the basis of the initial separating candidate points and an original image of the memory 409 which is in practice a subject of the contour separation, accurate separating candidate point in each spectral component is determined from each of the modules 403, 404 and 405 for determining the contour candidate points of respective spectral components. This is due to a fact that when the boundary between a yellow area and a green area which have the same brightness is to be determined, the red light spectral component which is not included in the green light spectral component, but is included the yellow spectral component can be easily detected by using the module 403 for determining the contour candidate points based upon the red light spectrum. The contour candidate points determined in respective spectral components are compared with each other by the module 406. This is because when the boundary between a yellow area and a green area having the same brightness is determined, the green spectral component included in both colors can be detected by using the module 404 for determining the contour candidate points based upon the green light spectrum while the contour candidate points cannot be detected by using only the module 404 since the green spectral components included in both yellow and green spectra are same in light intensity. Accordingly, contour candidate points which are closer to a true contour can be calculated by using the detectable red spectral component. On the basis of the results from the modules 403, 404 and 405, contour candidate points which are closer to a true contour can be determined as separating points by the separating point specifying module 407. The module 408 for separating an image determines each of the coordinates on the external line of the image to be separated by interpolating the image separating points determined by the separating point specifying module 407 which are a set of the separating points with a straight line or a smooth curve. An image inside or outside of the external line is separated from the original image stored in the memory 409 based upon these coordinates. The separation can be easily achieved by using a method which is disclosed in detail in the above cited article "Scanline Conversion of a polygon (2)" (PIXEL NO. 16. pages 136–141). The separated image is preserved in the memory 411 and is output from the image separating apparatus 400.

When it is not necessary to preserve the separated image in the image separating apparatus 400, an output of the module 408 may be directly output externally of the apparatus 400 without storing it in the memory 411.

The present embodiment is an exemplary structure for performing the image separating point detection and image separating processing. It is to be understood that the invention is not limited to only this structure.

Candidate points on the contour closer to a true image are determined by specifying an coarse contour and detection of the image separating points is carried out and the image separating processing is then carried out in accordance with the present embodiment.

As mentioned above, only the edge of a given subject or object can be positively determined by using color components in an image in accordance with the present invention. Since a user can directly intervene in a portion having such a complicated shape or a small change in light intensity that the edge is difficult to determine on a screen by a simple operation, the separation points of an image can be detected at a high precision while automatic process for detecting image separating point is being performed.

We claim:

1. A method for detecting image separating points where only a given subject image is separated from images, said method comprising the steps of:

a first step for displaying on a screen a plurality of candidate points in the vicinity of a boundary of said given subject image, which are input by a user;

a second step for determining and displaying a smooth curve which connects said plurality of candidate points;

a third step for determining a rate of change in intensity of each of a plurality of light components of said image having different wavelengths along a straight line normal to said curve at each of said plurality of candidate points;

a fourth step for correcting the position of each of said candidate points, respectively, by calculating a corrected position for each of said plurality of candidate points based upon the rate of change in intensity of light determined at each of said plurality of light components of said plurality of candidate points;

the calculation of the corrected position of each of said plurality of candidate points includes determining a preliminary corrected point for each of said plurality of light components of each of said plurality of candidate points based on the rate of change in intensity of each of said plurality of light components; and a fifth step for determining and displaying a smooth curve connecting said corrected candidate points.

2. A method for detecting image separating points according to claim 1, wherein when at least two of said preliminary corrected points are within a predetermined distance of each other, the corrected position of the corresponding candidate point is determined to be the average of the coordinates of the at least two preliminary corrected points, when none of said preliminary corrected points are within a predetermined distance of each other, no corrected position of the corresponding candidate points is determined to exist, and the corresponding candidate point is used as the corrected candidate point, when only one preliminary corrected point is determined to exist for any one of said plurality of light components of said plurality of candidate points, the one preliminary corrected point is used as the corrected candidate point, and when no preliminary corrected point is determined to exist for any of said plurality of light components of said plurality of candidate points, the corresponding candidate point is used as the corrected candidate point.

3. A method for detecting image separating points according to claim 1 wherein, when the rate of change in the intensity of each of said plurality of light components is determined in said third step, designated values of threshold parameters for determining the rate of change in intensity of each of said plurality of light components for detecting an edge shape of said subject image are changed.

4. A method for detecting image separating points according to claim 1 wherein, when a smooth curve connecting the plurality of candidate points is determined in said second step, the position of at least one of said candidate points is preliminarily designated as a fixed point for which there is no processing in said third and fourth steps, while processing of the second to fifth steps is performed for all of the remaining candidate points.

5. A method for detecting image separating points according to claim 1 wherein, in said third step, processing for determining said rate of change in the intensity of each of said plurality of light components is sequentially performed from the external to internal slide along the straight line normal to said curve at each of said candidate points on said curve traced in the vicinity of the contour of the subject, and a point which satisfies conditional formulae representing that the rate of change for correcting said plurality of candidate points is higher than the threshold is determined as the position of a preliminary corrected point.

6. A method for detecting image separating points according to claim 5 wherein, after processing of said fifth step, said threshold of said rate of change is changed for at least one of said candidate points which are determined as not satisfying said conditional formulae as a result of the determination of said rate of change in intensity of each of said plurality of light components in said fourth step, and then processing of said third to fifth steps is repeated at least once for said at least one candidate point.

7. A method for detecting image separating points according to claim 5, further including steps of determining a candidate point input in the first step to be the position of the corrected candidate point, and adding to said candidate point an attribute representing that it does not satisfy the conditional formulae for correcting the position, including displaying said candidate point in a color different from that of the other point on the screen.

8. A method for detecting image separating points according to claim 5, further including the steps of determining a candidate point input in the fourth step to be the position of the corrected candidate point, and adding to said candidate point an attribute representing that it satisfies the conditional formulae for correcting the position, including displaying said candidate point in a color different from that of the other point on the screen.

9. A method for detecting image separating points according to claim 1 wherein, if processing is repeated again from the second step after completion of said fifth step, at least one candidate point is designated as a fixed point for which there is no processing in said third and fourth steps, and each processing of the third, fourth and fifth steps is repeated at least once from a point adjacent to said fixed point for all of the remaining candidate points.

10. A method according to claim 2, wherein said predetermined distance is variable.

11. An apparatus for detecting image separating points where only a given subject image is separated from images, said apparatus comprising:

first means for displaying on a screen a plurality of candidate points in the vicinity of a boundary of said given subject image, which are input by a user;

second means for determining and displaying a smooth curve which connects said plurality of candidate points;

third means for determining a rate of change in intensity of each of a plurality of light components of said image having different wavelengths along a straight line normal to said curve at each of said plurality of candidate points;

fourth means for correcting the position of each of said candidate points, respectively, by calculating a corrected position for each of said plurality of candidate points based upon the rate of change in intensity of light determined at each of said plurality of light components of said plurality of candidate points, said fourth means including means for determining a preliminarily corrected point for each of said plurality of light components of each of said plurality of candidate points based on the rate of change in intensity of each of said plurality of light components; and fifth means for determining and displaying a smooth curve connecting said corrected candidate points.

* * * * *